(12) United States Patent
Zhang

(10) Patent No.: US 12,177,919 B2
(45) Date of Patent: Dec. 24, 2024

(54) METHOD AND DEVICE IN COMMUNICATION NODES FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 457 days.

(21) Appl. No.: 17/179,389

(22) Filed: Feb. 18, 2021

(65) Prior Publication Data

US 2021/0337616 A1   Oct. 28, 2021

Related U.S. Application Data

(63) Continuation of application No. PCT/CN2020/115878, filed on Sep. 17, 2020.

(30) Foreign Application Priority Data

Apr. 22, 2020  (CN) .......................... 202010320583.1
Jun. 2, 2020   (CN) .......................... 202010487649.6

(51) Int. Cl.
  *H04W 76/18*    (2018.01)
  *H04W 72/20*    (2023.01)
  (Continued)

(52) U.S. Cl.
  CPC ........... *H04W 76/18* (2018.02); *H04W 72/20* (2023.01); *H04W 76/19* (2018.02); *H04W 36/0069* (2018.08)

(58) Field of Classification Search
  CPC .. H04W 76/18; H04W 72/0406; H04W 76/19
  See application file for complete search history.

(56) References Cited

U.S. PATENT DOCUMENTS 10,484,931 B2   11/2019  Grossman
10,848,993 B2*  11/2020  Martin .................. H04W 76/19
(Continued)

FOREIGN PATENT DOCUMENTS

CN   107690162 A   2/2018
CN   108496385 A   9/2018
(Continued)

OTHER PUBLICATIONS

ISR received in application No. PCT/CN2020/115878 dated Jan. 21, 2021.
(Continued)

*Primary Examiner* — Parth Patel

(57) ABSTRACT

Present disclosure provides method and device in communication nodes for wireless communication. The communication node determines that a radio connection failure occurs in a first cell, generates a first failure message; when the first condition set is satisfied, transmits a first signaling; when the first condition set is not satisfied, transmits a second signaling; and receives a third signaling; the first signaling is used for initiating a radio connection recovery performed on the first cell, the first signaling comprises a first failure sub-message; the first failure message comprises the first failure sub-message; the second signaling is used for requesting a radio resource control reestablishment; the first condition set comprises a phrase for determining that the radio connection failure occurs in the first cell; the third signaling is used for updating a radio connection; when the first condition set is satisfied, the first signaling is used for triggering the third signaling.

20 Claims, 13 Drawing Sheets

(51) Int. Cl.
*H04W 76/19* (2018.01)
*H04W 36/00* (2009.01)

(56) References Cited

U.S. PATENT DOCUMENTS

| | | | |
|---|---|---|---|
| 2016/0366720 A1* | 12/2016 | Wu | H04W 28/0236 |
| 2018/0199163 A1* | 7/2018 | Chen | H04W 48/14 |
| 2018/0227980 A1* | 8/2018 | Uchino | H04W 24/08 |
| 2020/0015142 A1* | 1/2020 | Jia | H04W 36/305 |
| 2020/0059395 A1* | 2/2020 | Chen | H04W 28/082 |
| 2020/0106700 A1* | 4/2020 | Jo | H04W 40/02 |
| 2020/0305216 A1* | 9/2020 | Kim | H04W 76/19 |
| 2020/0351968 A1* | 11/2020 | Yilmaz | H04W 76/25 |
| 2021/0068162 A1* | 3/2021 | Agiwal | H04L 41/0668 |
| 2021/0168889 A1* | 6/2021 | Kimba Dit Adamou | H04W 76/19 |
| 2021/0377757 A1* | 12/2021 | Liu | H04L 1/1896 |
| 2021/0385897 A1* | 12/2021 | Purkayastha | H04W 36/305 |
| 2022/0038968 A1* | 2/2022 | Latheef | H04W 36/0061 |
| 2022/0053589 A1* | 2/2022 | Zhang | H04W 76/19 |
| 2022/0124568 A1* | 4/2022 | Wu | H04W 76/19 |
| 2022/0159483 A1* | 5/2022 | Lee | H04W 76/19 |
| 2022/0174772 A1* | 6/2022 | Luo | H04W 36/305 |
| 2022/0286881 A1* | 9/2022 | Orsino | H04W 36/305 |
| 2022/0368479 A1* | 11/2022 | Jiang | H04L 5/005 |
| 2022/0386404 A1* | 12/2022 | Fujishiro | H04W 24/04 |
| 2022/0400417 A1* | 12/2022 | Zhang | H04W 36/0079 |
| 2023/0040003 A1* | 2/2023 | Kim | H04W 76/18 |
| 2023/0081518 A1* | 3/2023 | Jin | H04W 76/19 370/311 |
| 2023/0086398 A1* | 3/2023 | Teyeb | H04W 76/19 |
| 2023/0156539 A1* | 5/2023 | Wu | H04W 36/0079 370/331 |
| 2023/0164866 A1* | 5/2023 | Chang | H04W 76/20 370/329 |

FOREIGN PATENT DOCUMENTS

| | | |
|---|---|---|
| CN | 110121187 A | 8/2019 |
| CN | 110831254 A | 2/2020 |
| CN | 110839258 A | 2/2020 |
| CN | 110913428 A | 3/2020 |
| WO | 2021175744 A1 | 9/2021 |

OTHER PUBLICATIONS

First Office Action received in application No. CN202010487649.6 dated Aug. 10, 2021.
First Search Report received in application No. CN202010487649.6 dated Aug. 3, 2021.
Second Office Action received in application No. CN202010487649.6 dated Oct. 11, 2021.
Second Search Report received in application No. CN202010487649.6 dated Sep. 18, 2021.
3GPP TSG RAN WG3 Meeting #108Bis.R3-185539,Discussion on backhaul link failure and recovery,ZTE Oct. 12, 2018.
3GPP TS 38.331 V16.0.0 Radio Resource Control (RRC)protocol specification Mar. 31, 2020.
3GPP TS 38.331 V16.0.0 Radio Resource Control (RRC) Mar. 31, 2020.
First Office Action received in application No. EP20932514.1 dated Aug. 24, 2023.
Supplementary Search Report of Chinese patent application No. CN202010487649.6 dated Oct. 26, 2021.
Notification to Grant Patent Right for Invention of Chinese patent application No. CN202010487649.6 dated Nov. 3, 2021.
First Office Action of Chinese patent application No. CN202111410503.2 dated Jan. 11, 2024.
First Search Report of Chinese patent application No. CN202111410503.2 dated Jan. 5, 2024.
First Office Action received in application No. IN202217065602 dated Jan. 15, 2024.

* cited by examiner

First cell $\xrightarrow{\text{comprising}}$ A cell in first cell group

FIG. 10

First failure sub-message $\xrightarrow{\text{comprising}}$ Second field

FIG. 11

METHOD AND DEVICE IN COMMUNICATION NODES FOR WIRELESS COMMUNICATION

CROSS REFERENCE TO RELATED APPLICATIONS

This application is a continuation of International Application No. PCT/CN2020/115878, which is filed Sep. 17, 2020, claims the priority benefit of Chinese Patent Application No. 202010487649.6, which is filed on Jun. 2, 2020 and the priority benefit of Chinese Patent Application No. 202010320583.1, filed on Apr. 22, 2020, the full disclosure of which is incorporated herein by reference.

BACKGROUND

Technical Field

The present disclosure relates to transmission methods and devices in wireless communication systems, and in particular to a transmission method and device of a radio link failure report.

Related Art

A Radio Link Failure (RLF) report of a User Equipment (UE) is used for optimizing coverage area and mobility robustness. The UE stores information related to a latest RLF or a Handover Failure (HOF), and then indicates the RLF report's availability during each subsequent Radio Resource Control (RRC) connection reestablishment and inter-cell handover, and drops the information until the network acquires the RLF report or drops the information 48 hours after the RLF. Self-Organizing Networks (SON) include network self-configuration and self-optimization, a work item (WI) of New Radio (NR) SON/Minimization of Drive Tests (MDT) data collection enhancement was approved at 3rd Generation Partnership Project (3GPP) RAN #86, which supports features of SON data collection features such as mobility enhancement and optimization and handover success report, as well as supports features of MDT data collection such as 2-step Random Access Channel (RACH) optimization and RLF reporting. Fast Master Cell Group (MCG) recovery was studied in a WI of enhanced Dual Connectivity and Carrier Aggregation (eDCCA) in Release 16, wherein an MCG link recovery through a Secondary Cell Group (SCG) after an MCG RLF is supported.

SUMMARY

When an RLF occurs in an MCG, the UE stores MCG RLF-related information in a variable VarRLF-Report. And when the UE performs a fast MCG recovery through MCG Failure Information procedure, an MCGFailureInformation message sent to the network carries a FailureReportMCG, which comprises the MCG RLF-related information; when the UE receives a UEInformationRequest, it will report information stored in the VarRLF-Report in UEInformationResponse. Both the FailureReportMCG and the RLF-Report carry MCG RLF-related information, in which plenty of information, including a UE measurement report and a cause for MCG failure, is repetitive, thus resulting in redundancy in reporting information. On the other hand, the conventional RLF-Report requires the UE to report after receiving the UEInformationRequest, and when the UE does not receive the UEInformationRequest message 48 hours after the MCG RLF, information stored in the VarRLF-Report will be deleted. If afterwards the UE moves to a Public Land Mobile Network (PLMN) different from a base station where the MCG RLF occurs, the UE will not be triggered to report the RLF-Report, thus leading to a missed or delayed reporting on the MCG RLF-related information. Therefore, when the MCG can perform a fast MCG recovery, the reporting mode of MCG RLF-related information needs to be enhanced.

In view of the above problem, the present disclosure provides a solution. In view of the above problem, a terrestrial transmission scenario is used as an example; the present disclosure is also applicable to scenarios such as NTN to achieve technical effects similar in the terrestrial transmission scenario. Besides, a unified solution applied in different scenarios also helps to reduce hardware complexity and the cost.

It should be noted that the embodiments of any node in the present disclosure and the characteristics of the embodiments may be applied to any other node if no conflict is incurred. The embodiments of the present disclosure and the characteristics of the embodiments may be mutually combined if no conflict is incurred.

The present disclosure provides a method in a first node for wireless communications, comprising:
- determining that a radio connection failure occurs in a first cell, as a response to determining that the radio connection failure occurs in the first cell, generating a first failure message;
- when the first condition set is satisfied, transmitting a first signaling; when the first condition set is not satisfied, transmitting a second signaling; and
- receiving a third signaling;
- herein, the first signaling is used for initiating a radio connection recovery performed on the first cell, the first signaling comprises a first failure sub-message; the first failure message comprises the first failure sub-message; the second signaling is used for requesting a radio resource control reestablishment; the first condition set comprises a phrase for determining that the radio connection failure occurs in the first cell; the third signaling is used for updating a radio connection; when the first condition set is satisfied, the first signaling is used for triggering the third signaling, and when the first condition set is not satisfied, the second signaling is used for triggering the third signaling.

In one embodiment, a problem to be solved in the present disclosure comprises: when an RLF occurs in the UE and a fast MCG recovery is performed, MCG RLF-related information will be reported via MCGFailureInformation message and UEInformationResponse message, wherein the MCGFailureInformation message and UEInformationResponse message comprise plenty of repetitive information, resulting in redundancy in reporting.

In one embodiment, a problem to be solved in the present disclosure comprises: repeated reporting of information will increase UE signaling overhead.

In one embodiment, a problem to be solved in the present disclosure comprises: repeated reporting of information will increase information processing payload of the base station.

In one embodiment, a problem to be solved in the present disclosure comprises: it is not conducive to network coverage optimization.

In one embodiment, a problem to be solved in the present disclosure comprises: it is not conducive to mobility enhancement.

In one embodiment, a problem to be solved in the present disclosure comprises: when an MCG RLF occurs in the UE, the UE performs an MCG radio link recovery through an SCG.

In one embodiment, a problem to be solved in the present disclosure comprises: when an MCG RLF occurs in the UE and an SCG is available, an RLF-Report is reported through the SCG.

In one embodiment, a problem to be solved in the present disclosure comprises: when an MCG RLF occurs in the UE, an RLF-Report is reported in MCG failure information procedure.

In one embodiment, a problem to be solved in the present disclosure comprises: when an MCG RLF occurs in the UE, information in an RLF-Report is increased in MCG failure information procedure.

In one embodiment, the above method is characterized in comprising: an enhancement is performed on a first failure sub-message.

In one embodiment, the above method is characterized in comprising: an enhancement is performed on a first failure sub-message, the first failure sub-message may comprise all of information in the first failure message.

In one embodiment, the above method is characterized in comprising: a first failure sub-message comprises RA-related information.

In one embodiment, the above method is characterized in comprising: failure reasons of a first failure sub-message include a beam failure and a beam recovery failure.

In one embodiment, the above method is characterized in comprising: a first failure sub-message comprises a measurement result of WLAN.

In one embodiment, the above method is characterized in comprising: a first failure sub-message comprises a measurement result of BT.

In one embodiment, the above method is characterized in comprising: a first failure sub-message comprises information of UE's position.

In one embodiment, the above method is advantageous in comprising: when an RLF occurs in the UE and a fast MCG recovery is performed, information related to MCG RLF can be acquired as soon as possible.

In one embodiment, the above method is advantageous in comprising: it is conducive to network coverage optimization.

In one embodiment, the above method is advantageous in comprising: it is conducive to mobility enhancement.

According to one aspect of the present disclosure, comprising:
transmitting a fourth signaling;
herein, the fourth signaling comprises information in the first failure message at least other than the first failure sub-message.

In one embodiment, the updating radio connection comprises radio resource control connection re-configuration.

In one embodiment, the above method is characterized in comprising: when the UE performs a fast MCG recovery and receives a radio resource control connection reconfiguration message, a reported first failure sub-message is not comprised in a reported RLF report.

In one embodiment, the above method is characterized in comprising: when the UE performs a fast MCG recovery and receives a radio resource control connection reconfiguration message, only a remaining part of MCG RLF information needs to be reported.

In one embodiment, the above method is characterized in comprising: when the UE performs a fast MCG recovery, an RLF-Report can be transmitted through an SCG.

In one embodiment, the above method is advantageous in comprising: signaling overhead is saved.

In one embodiment, the above method is advantageous in comprising: signaling payload is reduced.

In one embodiment, the above method is advantageous in comprising: transmission of RLF-Report information is performed as soon as possible.

According to one aspect of the present disclosure, wherein the third signaling comprises a first field, and a first field in the third signaling is used for triggering the fourth signaling.

In one embodiment, the above method is characterized in comprising: a new field is added to a radio resource control connection reconfiguration message to indicate the UE to report an RLF-Report.

In one embodiment, the above method is advantageous in comprising: a timely scheduling of an RLF-Report is performed to avoid a delay or an omission in reporting.

According to one aspect of the present disclosure, wherein when the fourth signaling is triggered by a first message, the fourth signaling comprises the first failure sub-message; when the fourth signaling is triggered by the third signaling, the fourth signaling does not comprise the first failure sub-message.

According to one aspect of the present disclosure, the above method is characterized in comprising: the UE can report a complete or part of RLF-Report according to different situations.

In one embodiment, the above method is advantageous in comprising: the signaling overhead is reduced.

According to one aspect of the present disclosure, comprising:
clearing the first failure message.

In one embodiment, the above method is characterized in comprising: when MCG RLF information is reported through MCG Failure Information, the first failure message is deleted.

In one embodiment, the above method is characterized in comprising: when MCG RLF information is reported through MCG Failure Information, MCG RLF-related information stored in a VarRLF-Report is deleted.

In one embodiment, the above method is characterized in comprising: when the UE is scheduled by a third signaling for transmitting a fourth signaling, the first failure message is deleted.

In one embodiment, the above method is characterized in comprising: when the UE receives an indication from a first field in a third signaling to report an RLF-Report, the UE performs the RLF-Report reporting and deletes MCG RLF-related information stored in a VarRLF-Report.

In one embodiment, the above method is advantageous in comprising: redundant reporting of MCG RLF information is avoid.

According to one aspect of the present disclosure, comprising:
transmitting a fifth signaling;
herein, the fifth signaling is used for performing a confirmation on the third signaling; the fifth signaling indicates whether the first failure message is available.

According to one aspect of the present disclosure, wherein the first failure sub-message comprises a second filed, and the second field is used for indicating RA information.

The present disclosure provides a method in a second node for wireless communications, comprising:

when the first condition set is satisfied, receiving a first signaling; when the first condition set is not satisfied, receiving a second signaling; and transmitting a third signaling;

herein, as a response to determining that the radio connection failure occurs in a first cell, a first failure message is generated; the first signaling is used for initiating a radio connection recovery performed on the first cell, the first signaling comprises a first failure sub-message; the first failure message comprises the first failure sub-message; the second signaling is used for requesting a radio resource control reestablishment; the first condition set comprises a phrase for determining that the radio connection failure occurs in the first cell; the third signaling is used for updating a radio connection; when the first condition set is satisfied, the first signaling is used for triggering the third signaling, and when the first condition set is not satisfied, the second signaling is used for triggering the third signaling.

According to one aspect of the present disclosure, comprising:

receiving a fourth signaling;

herein, the fourth signaling comprises information in the first failure message at least other than the first failure sub-message.

In one embodiment, the updating radio connection comprises radio resource control connection re-configuration.

According to one aspect of the present disclosure, wherein the third signaling comprises a first field, and a first field in the third signaling is used for triggering the fourth signaling.

According to one aspect of the present disclosure, wherein when the fourth signaling is triggered by a first message, the fourth signaling comprises the first failure sub-message; when the fourth signaling is triggered by the third signaling, the fourth signaling does not comprise the first failure sub-message.

According to one aspect of the present disclosure, wherein the first failure message is cleared.

According to one aspect of the present disclosure, comprising:

receiving a fifth signaling;

herein, the fifth signaling is used for performing a confirmation on the third signaling; the fifth signaling indicates whether the first failure message is available.

According to one aspect of the present disclosure, wherein the first failure sub-message comprises a second filed, and the second field is used for indicating RA information.

The present disclosure provides a first node for wireless communications, comprising:

a first receiver, determining that a radio connection failure occurs in a first cell, as a response to determining that the radio connection failure occurs in the first cell, generating a first failure message;

a first transmitter, when the first condition set is satisfied, transmitting a first signaling; when the first condition set is not satisfied, transmitting a second signaling; and the first receiver, receiving a third signaling;

herein, the first signaling is used for initiating a radio connection recovery performed on the first cell, the first signaling comprises a first failure sub-message; the first failure message comprises the first failure sub-message; the second signaling is used for requesting a radio resource control reestablishment; the first condition set comprises a phrase for determining that the radio connection failure occurs in the first cell; the third signaling is used for updating a radio connection; when the first condition set is satisfied, the first signaling is used for triggering the third signaling, and when the first condition set is not satisfied, the second signaling is used for triggering the third signaling.

The present disclosure provides a second node for wireless communications, comprising:

a second receiver, when the first condition set is satisfied, receiving a first signaling; when the first condition set is not satisfied, receiving a second signaling; and a second transmitter, transmitting a third signaling;

herein, as a response to determining that the radio connection failure occurs in a first cell, a first failure message is generated; the first signaling is used for initiating a radio connection recovery performed on the first cell, the first signaling comprises a first failure sub-message; the first failure message comprises the first failure sub-message; the second signaling is used for requesting a radio resource control reestablishment; the first condition set comprises a phrase for determining that the radio connection failure occurs in the first cell; the third signaling is used for updating a radio connection; when the first condition set is satisfied, the first signaling is used for triggering the third signaling, and when the first condition set is not satisfied, the second signaling is used for triggering the third signaling.

In one embodiment, the present disclosure has the following advantages over conventional schemes:

when an RLF occurs in the UE and a fast MCG recovery is performed, MCG RLF-related information can be acquired as soon as possible;

a timely scheduling of an RLF-Report is performed to avoid a missed or delayed reporting on the RLF-Report;

redundant reporting of MCG RLF information is avoid, thus reducing signaling overhead;

signaling payload is decreased;

it is conducive to network coverage optimization;

and it is conducive to mobility enhancement.

BRIEF DESCRIPTION OF THE DRAWINGS

Other features, objects and advantages of the present disclosure will become more apparent from the detailed description of non-restrictive embodiments taken in conjunction with the following drawings:

FIG. 10 illustrates a schematic diagram of a first cell group comprising a first cell according to one embodiment of the present disclosure.

FIG. 11 illustrates a schematic diagram of a first failure sub-message comprising a second field according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
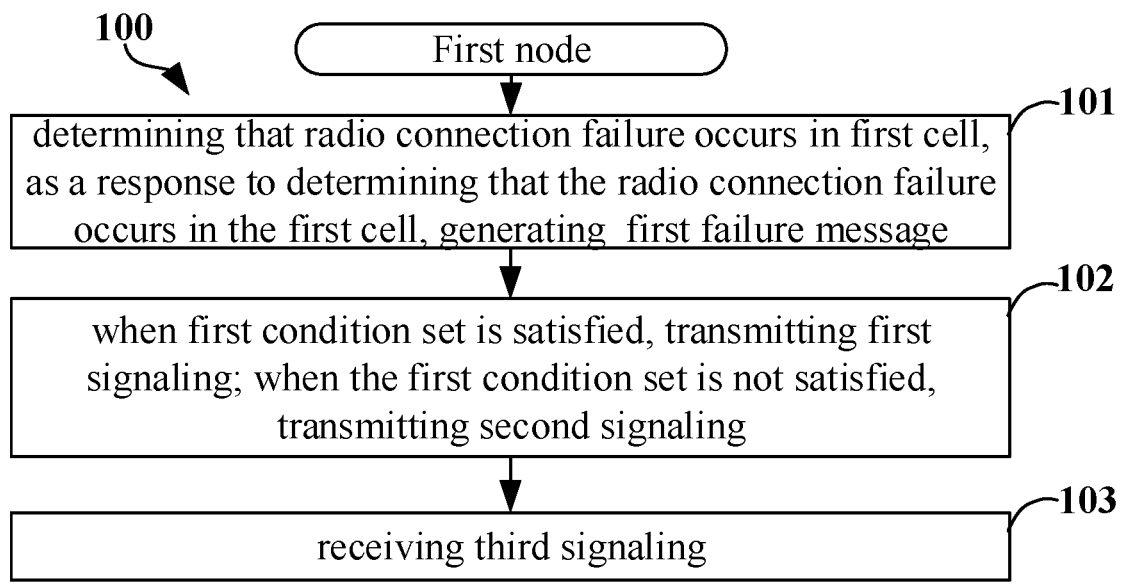
FIG. 1 illustrates a flowchart of transmission of a first signaling, a second signaling and a third signaling according to one embodiment of the present disclosure.

Embodiment 1 illustrates a flowchart of transmission of a first signaling, a second signaling and a third signaling according to one embodiment of the present disclosure, as shown in FIG. 1. In FIG. 1, each box represents a step. Particularly, the sequential order of steps in these boxes does not necessarily mean that the steps are chronologically arranged.

In Embodiment 1, a first node in the present disclosure determines that a radio connection failure occurs in a first cell in step 101, as a response to determining that the radio connection failure occurs in the first cell, generates a first failure message; when a first condition set is satisfied in step 102, transmits a first signaling; when a first condition set is not satisfied, transmits a second signaling; and receives a third signaling in step 103; herein, the first signaling is used for initiating a radio connection recovery performed on the first cell, the first signaling comprises a first failure sub-message; the first failure message comprises the first failure sub-message; the second signaling is used for requesting a radio resource control reestablishment; the first condition set comprises a phrase for determining that the radio connection failure occurs in the first cell; the third signaling is used for updating a radio connection; when the first condition set is satisfied, the first signaling is used for triggering the third signaling, and when the first condition set is not satisfied, the second signaling is used for triggering the third signaling.

In one embodiment, the first cell comprises a Serving Cell.

In one embodiment, the first cell comprises a Source Cell.

In one embodiment, the first cell comprises a Special Cell (SPCell).

In one subembodiment of the above embodiment, the SPCell comprises a Primary Cell (PCell).

In one subembodiment of the above embodiment, the SPCell comprises a Primary SCG Cell (PSCell).

In one embodiment, the first cell comprises a Secondary Cell (SCell).

In one embodiment, the phase for determining that a radio connection failure occurs in a first cell comprises that a radio connection failure is determined between the first node and the first cell.

In one embodiment, the phase for determining that a radio connection failure occurs in a first cell comprises that the first node determines that a radio link between the first node and the first cell fails.

In one embodiment, the radio connection failure comprises an RLF.

In one embodiment, the radio connection failure comprises an HOF.

In one embodiment, the first node determines the radio connection failure according to a wireless measurement.

In one subembodiment of the above embodiment, the wireless measurement is performed on a first serving cell.

In one subembodiment of the above embodiment, the wireless measurement comprises measuring a Synchronization Signal.

In one subembodiment of the above embodiment, the wireless measurement comprises a Cell-specific Reference Signal (SRS).

In one subembodiment of the above embodiment, the wireless measurement comprises a Synchronization Signal Reference Signal (SS-RS).

In one subembodiment of the above embodiment, the wireless measurement comprises a Synchronization Signal Block.

In one subembodiment of the above embodiment, the wireless measurement comprises a Primary Synchronization Signal.

In one subembodiment of the above embodiment, the wireless measurement comprises a Secondary Synchronization Signal (SSS).

In one subembodiment of the above embodiment, the wireless measurement comprises measuring a Synchronization Signal/Physical Broadcast Channel (SS/PBCH) Block.

In one subembodiment of the above embodiment, the wireless measurement comprises measuring a Channel State Information Reference Signal (CSI-RS).

In one subembodiment of the above embodiment, the wireless measurement comprises measuring a Physical Downlink Control Channel (PDCCH) common to cell.

In one subembodiment of the above embodiment, the wireless measurement comprises measuring a PBCH.

In one embodiment, when Timer T310 expires, the first node determines that the radio connection failure occurs in the first cell.

In one embodiment, when Timer T312 expires, the first node determines that the radio connection failure occurs in the first cell.

In one embodiment, when receiving an indication of reaching a maximum number of retransmissions from MCG Radio Link Control (RLC), the first node determines that the radio connection failure occurs in the first cell.

In one embodiment, when receiving an indication of reaching a maximum number of retransmissions of a Signaling Radio Bearer (SRB) or a Data Radio Bearer (DRB) from MCG RLC, the first node determines that the radio connection failure occurs in the first cell.

In one embodiment, when receiving a RA problem indication from MCG Medium Access Control (MAC), and timers T300, T301, T304, T311 and T319 are not running, the first node determines that the radio connection failure occurs in the first cell.

In one embodiment, when receiving an RA problem indication from MCG MAC, and timers T300, T301, T304 and T311 are not running, the first node determines that the radio connection failure occurs in the first cell.

In one embodiment, when timer T304 expires, the first node determines that the radio connection failure occurs in the first cell.

In one subembodiment of the above embodiment, the HOF comprises a Conditional Handover (CHO) failure.

In one subembodiment of the above embodiment, the HOF comprises a Conventional Handover (CHO) failure.

In one subembodiment of the above embodiment, the HOF comprises a Dual Active Protocol Stack (DAPS) handover failure.

In one embodiment, when the timer T304 is running, the radio connection failure occurs.

In one embodiment, when the timer T304 is not running, the radio connection failure occurs.

In one embodiment, as a response to determining that the radio connection failure occurs in the first cell, the phrase generating a first failure message comprises that when the radio connection failure occurs in the first cell, a first failure message is generated.

In one embodiment, as a response to determining that the radio connection failure occurs in the first cell, the phrase generating a first failure message comprises: the generation of the first failure message is triggered by the determination that the radio connection failure occurs in the first cell.

In one embodiment, as a response to determining that the radio connection failure occurs in the first cell, the phrase generating a first failure message comprises: the determination that the radio connection failure occurs in the first cell is used for triggering the generation of the first failure message.

In one embodiment, as a response to determining that the radio connection failure occurs in the first cell, the phrase generating a first failure message comprises: the determination that the radio connection failure occurs in the first cell is used for triggering the generation of the first failure message.

In one embodiment, meaning of the response includes a next action.

In one embodiment, meaning of the response includes feedback.

In one embodiment, the generating a first failure message comprises storing the first failure message.

In one embodiment, the generating a first failure message comprises saving the first failure message.

In one embodiment, the generating a first failure message comprises setting the first failure message.

In one embodiment, the generating a first failure message comprises logging the first failure message.

In one embodiment, the generating a first failure message comprises when information is stored in a VarRLF-Report, clearing information in the VarRLF-Report, and setting the VarRLF-Report to a value related to the radio connection failure.

In one embodiment, the first failure message comprises information related to the radio connection failure.

In one embodiment, the first failure message comprises an RLF report.

In one embodiment, the first failure message is stored in a VarRLF-Report.

In one embodiment, the first failure message comprises a VarRLF-Report.

In one embodiment, the first failure message comprises information stored in a VarRLF-Report.

In one embodiment, the first failure message comprises all of a VarRLF-Report.

In one embodiment, the first failure message comprises part of a VarRLF-Report.

In one embodiment, the first failure message comprises one or more fields in UEInformationResponse.

In one embodiment, the first failure message comprises a measResultLastServCell.

In one embodiment, the first failure message comprises measResultNeighCells.

In one embodiment, the first failure message comprises measResultListNR.

In one embodiment, the first failure message comprises measResultListEUTRA.

In one embodiment, the first failure message comprises a connectionFailureType.

In one embodiment, the first failure message comprises a rlf-Cause.

In one embodiment, the first failure message comprises a previousPCellId.

In one embodiment, the first failure message comprises a failedPCellId.

In one embodiment, the first failure message comprises message related to the radio connection failure.

In one embodiment, the first failure message comprises an MCG measurement result.

In one embodiment, the first failure message comprises an SCG measurement result.

In one embodiment, the first failure message comprises a Sidelink RLF report.

In one embodiment, the first failure message comprises a measurement result.

In one embodiment, the first failure message comprises a measurement result of the first cell.

In one embodiment, the first failure message comprises a measurement result of a neighbor cell of the first cell.

In one embodiment, the first failure message comprises Intra-RAT measurement results.

In one embodiment, the first failure message comprises Inter-RAT measurement results.

In one embodiment, the first failure message comprises a measurement result of an Evolved-UMTS Terrestrial Radio Access (EUTRA) cell.

In one embodiment, the first failure message comprises a measurement result of a New Radio (NR) cell.

In one embodiment, the first failure message comprises a measurement result of Wireless Local Area Network (WLAN).

In one embodiment, the first failure message comprises a measurement result of Bluetooth (BT).

In one embodiment, the first failure message comprises a connection failure type.

In one subembodiment of the above embodiment, the connection failure type comprises a handover failure.

In one subembodiment of the above embodiment, the connection failure type comprises an RLF.

In one embodiment, the first failure message comprises a cause for a connection failure.

In one subembodiment of the above embodiment, the reason of the connection failure comprises a basis for determining a radio connection failure in a first serving cell.

In one subembodiment of the above embodiment, the reason of the connection failure comprises t310-Expiry.

In one subembodiment of the above embodiment, the reason of the connection failure comprises t312-Expiry.

In one subembodiment of the above embodiment, the reason of the connection failure comprises a randomAccess-Problem.

In one subembodiment of the above embodiment, the reason of the connection failure comprises rlc-MaxNumRetx.

In one subembodiment of the above embodiment, the reason of the connection failure comprises a beamFailureRecoveryFailure.

In one embodiment, the first condition set comprises K first-type condition(s), K being a positive integer.

In one subembodiment of the above embodiment, the first-type condition comprises that the radio connection failure occurs in the first cell.

In one subembodiment of the above embodiment, the first-type condition comprises that the first node is configured with split SRB1.

In one subembodiment of the above embodiment, the first-type condition comprises that the first node is configured with SRB3.

In one subembodiment of the above embodiment, the first-type condition comprises that an MCG is not suspended.

In one subembodiment of the above embodiment, the first-type condition comprises that an SCG is not suspended.

In one subembodiment of the above embodiment, the first-type condition comprises that a first timer is configured, and the first timer is not running.

In one subsidiary embodiment of the above subembodiment, the first timer comprises T316.

In one subembodiment of the above embodiment, the first-type condition comprises that an RLF is detected in an SCG.

In one subembodiment of the above embodiment, the first-type condition comprises that a synchronization reconfiguration failure occurs in an SCG.

In one subembodiment of the above embodiment, the first-type condition comprises that a configuration failure occurs in an SCG.

In one subembodiment of the above embodiment, the first-type condition comprises that an integrity check failure indication from lower layers on SRB3 occurs in SCG.

In one embodiment, the K first-type condition(s) being satisfied is used for determining that the first condition set is satisfied.

In one embodiment, K1 condition(s) in the K first-type conditions being satisfied is used for determining that the first condition set is satisfied, K1 being a positive integer less than K.

In one embodiment, the first condition set being satisfied comprises that split SRB1 is configured in the UE or SRB3, an MCG and an SCG are not suspended, timer T316 is configured, an MCG RLF is detected and timer T316 is not running.

In one embodiment, the first condition set not being satisfied comprises a time when MCG RLF is detected and timer T316 is not configured.

In one embodiment, the first condition set not being satisfied comprises a time when an MCG synchronization reconfiguration fails.

In one embodiment, the first condition set not being satisfied comprises a time when NR mobility fails.

In one embodiment, the first condition set not being satisfied comprises a time when receiving an integrity check failure indication from lower layers on SRB1 or SRB2, and when an integrity check failure is not detected in an RRC Reestablishment message.

In one embodiment, the first condition set not being satisfied comprises a time when an RRC connection reconfiguration fails.

In one embodiment, the first condition set not being satisfied comprises that an SCG RLF is detected when an MCG transmission is suspended.

In one embodiment, the first condition set not being satisfied comprises that a synchronization reconfiguration failure occurs in an SCG when MCG transmission is suspended.

In one embodiment, the first condition set not being satisfied comprises that a change failure occurs in an SCG when MCG transmission is suspended.

In one embodiment, the first condition set not being satisfied comprises that a configuration failure occurs in an SCG when MCG transmission is suspended.

In one embodiment, the first condition set not being satisfied comprises that an integrity check failure indication from lower layers on SRB3 occurs in an SCG when MCG transmission is suspended.

In one embodiment, the first condition set not being satisfied comprises a time when timer T316 expires.

In one embodiment, the first condition set not being satisfied comprises that an RLF occurs in an MCG when SCG transmission is suspended.

In one embodiment, the first condition set not being satisfied comprises that an HOF occurs in an MCG when SCG transmission is suspended.

In one embodiment, the first condition set not being satisfied comprises that an RLF occurs in an MCG when an RLF occurs in an SCG.

In one embodiment, the first condition set not being satisfied comprises that an HOF occurs in an MCG when an RLF occurs in an SCG.

In one embodiment, a receiver of the first signaling comprises a maintenance base station of the first cell.

In one embodiment, a receiver of the first signaling comprises a maintenance base station of a second cell, and the second cell is different from the first cell.

In one subembodiment of the above embodiment, the second cell comprises a cell of an SCG.

In one subembodiment of the above embodiment, a maintenance base station of the second cell comprises a Secondary Node (SN).

In one embodiment, the first signaling is transmitted to a maintenance base station of the second cell, and the maintenance base station of the second cell forwards the first signaling to a maintenance base station of the first cell.

In one embodiment, the first cell and the second cell belong to a same PLMN.

In one subembodiment of the above embodiment, a Radio Access Technology (RAT) adopted by the PLMN comprises NR.

In one embodiment, an RAT adopted by the PLMN comprises a Long Term Evolution (LTE).

In one embodiment, the first signaling is transmitted via an air interface.

In one embodiment, the first signaling is transmitted via a radio interface.

In one embodiment, the first signaling is transmitted via a high-layer signaling.

In one embodiment, the first signaling comprises a higher-layer signaling.

In one embodiment, the first signaling comprises all or part of a high-layer signaling.

In one embodiment, the first signaling comprises an RRC message.

In one embodiment, the first signaling comprises all or part of IEs of an RRC message.

In one embodiment, the first signaling comprises all or part of fields in an IE in an RRC message.

In one embodiment, the first signaling comprises an Uplink (UL) signaling.

In one embodiment, a signaling radio bearer of the first signaling comprises SRB1.

In one embodiment, a signaling radio bearer of the first signaling comprises SRB3.

In one embodiment, a logical channel carrying the first signaling comprises a Dedicated Control Channel (DCCH).

In one embodiment, the first signaling comprises an MCGFailureInformation message.

In one embodiment, the first signaling comprises a FailureInformation2 message.

In one embodiment, the first signaling comprises MCGFailureInformationEUTRA.

In one embodiment, the first signaling comprises MCGFailureInformationNR.

In one embodiment, the first signaling comprises SCGFailureInformation.

In one embodiment, the first signaling comprises SCGFailureInformationNR.

In one embodiment, the first signaling comprises SCGFailureInformationEUTRA.

In one embodiment, the first signaling comprises SidelinkUEInformation.

In one embodiment, the first signaling comprises SidelinkUEInformationNR.

In one embodiment, the first signaling comprises SidelinkUEInformationEUTRA.

In one embodiment, the first signaling comprises FailureInformation.

In one embodiment, the first signaling comprises ULInformationTransferMRDC.

In one embodiment, the phrase that the first signaling is used for initiating a radio connection recovery performed on the first cell comprises that the first signaling is used for performing a radio connection recovery on the first cell.

In one embodiment, the phrase that the first signaling is used for initiating a radio connection recovery performed on the first cell comprises that the first signaling is a first message in an MCG Failure Information procedure.

In one embodiment, the phrase that the first signaling is used for initiating a radio connection recovery performed on the first cell comprises that the first signaling is used for initiating an MCG Failure Information procedure.

In one embodiment, the phrase that the first signaling is used for initiating a radio connection recovery performed on the first cell comprises that the first signaling being transmitted is used for determining an execution of the radio connection recovery.

In one embodiment, the radio connection recovery is performed through an MCG Failure Information procedure.

In one embodiment, the radio connection recovery is performed through an SCG.

In one embodiment, the radio connection recovery is performed through a CHO procedure.

In one embodiment, the radio connection recovery is performed through a Sidelink.

In one embodiment, the radio connection recovery is performed through WLAN.

In one embodiment, the radio connection recovery is performed through BT.

In one embodiment, a transmitter of the second signaling comprises a receiver of the first signaling.

In one embodiment, a transmitter of the second signaling comprises a maintenance base station of a cell determined through cell selection.

In one embodiment, the second signaling is transmitted via an air interface.

In one embodiment, the second signaling is transmitted via a radio interface.

In one embodiment, the second signaling is transmitted via a high-layer signaling.

In one embodiment, the second signaling comprises a higher-layer signaling.

In one embodiment, the second signaling comprises all or part of a high-layer signaling.

In one embodiment, the second signaling comprises an RRC message.

In one embodiment, the second signaling comprises all or part of IEs in an RRC message.

In one embodiment, the second signaling comprises all or part of fields in an IE of an RRC message.

In one embodiment, the second signaling comprises a UL signaling

In one embodiment, a signaling radio bearer of the second signaling comprises SRB0.

In one embodiment, a logical channel carrying the second signaling comprises a Common Control Channel (CCCH).

In one embodiment, the second signaling comprises an RRCReestablishmentRequest.

In one embodiment, the second signaling comprises an RRCConnectionReestablishmentRequest.

In one embodiment, the phrase that the second signaling is used for requesting a radio resource control reestablishment comprises that the second signaling is used for performing a radio resource control reestablishment on the first cell.

In one embodiment, the phrase that the second signaling is used for requesting a radio resource control reestablishment comprises that the second signaling is a first message in a radio resource control reestablishment procedure.

In one embodiment, the phrase that the second signaling is used for requesting a radio resource control reestablishment comprises that the second signaling is used to initiate a radio resource control reestablishment procedure.

In one embodiment, the phrase that the second signaling is used for requesting a radio resource control reestablishment comprises that the second signaling being transmitted is used for determining an execution of a radio resource control reestablishment.

In one embodiment, a transmitter of the third signaling comprises an SCG.

In one embodiment, a transmitter of the third signaling comprises an SN.

In one embodiment, a transmitter of the third signaling comprises a maintenance base station of an SPCell.

In one embodiment, a transmitter of the third signaling comprises a receiver of the first signaling.

In one embodiment, a transmitter of the third signaling comprises a receiver of the second signaling.

In one embodiment, the third signaling is transmitted via an air interface.

In one embodiment, the third signaling is transmitted via a radio interface.

In one embodiment, the third signaling is transmitted via a high-layer signaling.

In one embodiment, the third signaling comprises a higher-layer signaling.

In one embodiment, the third signaling comprises all or part of a high-layer signaling.

In one embodiment, the third signaling comprises an RRC message.

In one embodiment, the third signaling comprises all or part of IEs of an RRC message.

In one embodiment, the third signaling comprises all or part of fields in an IE in an RRC message.

In one embodiment, the third signaling comprises a Downlink (DL) signaling.

In one embodiment, a signaling radio bearer of the third signaling comprises SRB1.

In one embodiment, a signaling radio bearer of the third signaling comprises SRB3.

In one embodiment, a signaling radio bearer of the third signaling comprises a Sidelink SRB.

In one embodiment, a signaling radio bearer of the third signaling comprises PC5-RRC.

In one embodiment, a logical channel carrying the third signaling comprises a DCCH.

In one embodiment, a logical channel carrying the third signaling comprises a SCCH.

In one embodiment, the third signaling is used for a radio resource control connection reconfiguration.

In one embodiment, the third signaling is used for a radio resource control connection release.

In one embodiment, the third signaling is used for a radio resource control connection reestablishment.

In one embodiment, the third signaling comprises an RRCReestablishment message.

In one embodiment, the third signaling comprises an RRCConnectionReestablishment message.

In one embodiment, the third signaling comprises an RRCReconfiguration message.

In one embodiment, the third signaling comprises an RRCConnectionReconfiguration message.

In one embodiment, the third signaling comprises an RRCRelease message.

In one embodiment, the third signaling comprises an RRCConnectionRelease message.

In one embodiment, the third signaling comprises an RRCReestablishmentComplete message.

In one embodiment, the third signaling comprises an RRCConnectionReestablishmentComplete message.

In one embodiment, the third signaling comprises a DLInformationTransferMRDC message.

In one embodiment, the third signaling comprises an RRCReconfigurationSidelink.

In one embodiment, the third signaling comprises a reconfigurationWithSync.

In one embodiment, the phrase that the third signaling is used for updating a radio connection comprises that the third signaling is used for triggering an update of an RRC state.

In one embodiment, the phrase that the third signaling is used for updating a radio connection comprises that the third signaling is used for triggering an update of an RRC configuration.

In one embodiment, the phrase that the third signaling is used for updating a radio connection comprises that the third signaling is used for configuring an SRB.

In one embodiment, the phrase that the third signaling is used for updating a radio connection comprises that the third signaling is used for triggering an RRC connection reestablishment.

In one embodiment, the phrase that the third signaling is used for updating a radio connection comprises that the third signaling is used for triggering an RRC connection reconfiguration.

In one embodiment, the phrase that the third signaling is used for updating a radio connection comprises that the third signaling is used for triggering an RRC connection release.

In one embodiment, the phrase that the third signaling is used for updating a radio connection comprises that the third signaling is used for triggering an RRC connection establishment.

In one embodiment, the phrase that the first signaling comprises a first failure sub-message comprises that the first failure sub-message is one or more IEs in the first signaling.

In one embodiment, the phrase that the first signaling comprises a first failure sub-message comprises that the first failure sub-message is one or more fields in the first signaling.

In one embodiment, the phrase that the first signaling comprises a first failure sub-message comprises that the first signaling is used for determining the first failure sub-message.

In one embodiment, the phrase that the first signaling comprises a first failure sub-message comprises that the first signaling is used for carrying the first failure sub-message.

In one embodiment, the phrase that the first signaling comprises a first failure sub-message comprises that the first failure sub-message is transmitted to network via the first signaling.

In one embodiment, the first failure sub-message comprises an MCG failure report.

In one embodiment, the first failure sub-message comprises an SCG failure report.

In one embodiment, the first failure sub-message comprises an FailureReportMCG.

In one embodiment, the first failure sub-message comprises FailureReportMCG-EUTRA In one embodiment, the first failure sub-message comprises FailureReportMCG-NR.

In one embodiment, the first failure sub-message comprises a FailureReportSCG.

In one embodiment, the first failure sub-message comprises FailureReportSCG-EUTRA.

In one embodiment, the first failure sub-message comprises FailureReportSCG-NR.

In one embodiment, the first failure sub-message comprises a FailureInfoDAPS.

In one embodiment, the first failure sub-message comprises a FailureReportMCGSidelink.

In one embodiment, the first failure sub-message comprises locationInfo.

In one embodiment, the first failure sub-message comprises a PLMN.

In one embodiment, the first failure sub-message comprises a Tracking Area Code (TAC).

In one embodiment, the first failure sub-message comprises a physCellId.

In one embodiment, the first failure sub-message comprises first sub-information, the first sub-information is used for indicating a cause for the radio connection failure.

In one embodiment, the phrase that the first sub-information is used for indicating a cause for the radio connection failure comprises that a value of the first sub-information is used for indicating a cause for the radio connection failure.

In one subembodiment of the above embodiment, the first sub-information comprises a filed in the first signaling.

In one subembodiment of the above embodiment, the first sub-information comprises a field in the first failure sub-message.

In one subembodiment of the above embodiment, the first sub-information comprises a failureType.

In one subembodiment of the above embodiment, the first sub-information comprises a rlf-Cause.

In one subembodiment of the above embodiment, a value of the first sub-information comprises t310-Expiry.

In one subembodiment of the above embodiment, a value of the first sub-information comprises t312-Expiry.

In one subembodiment of the above embodiment, a value of the first sub-information comprises a randomAccessProblem.

In one subembodiment of the above embodiment, a value of the first sub-information comprises a rlc-MaxNumRetx.

In one subembodiment of the above embodiment, a value of the first sub-information comprises a beamFailureRecoveryFailure.

In one subembodiment of the above embodiment, a value of the first sub-information comprises T304-Expiry.

In one embodiment, the first failure sub-message comprises second sub-information, and the second sub-information is used for indicating a measurement report.

In one subembodiment of the above embodiment, the second sub-information comprises a filed in the first signaling.

In one subembodiment of the above embodiment, the second sub-information comprises a field in the first failure sub-message.

In one subembodiment of the above embodiment, the second sub-information comprises a measurement result of an MCG.

In one subembodiment of the above embodiment, the second sub-information comprises a measurement result of an SCG.

In one subembodiment of the above embodiment, the second sub-information comprises a measurement result of a serving cell.

In one subembodiment of the above embodiment, the second sub-information comprises a measurement result of a neighbor cell.

In one subembodiment of the above embodiment, the second sub-information comprises Inter-RAT measurement results.

In one subembodiment of the above embodiment, the second sub-information comprises Intra-RAT measurement results.

In one subembodiment of the above embodiment, the second sub-information comprises a measurement result of a EUTRA cell.

In one subembodiment of the above embodiment, the second sub-information comprises a measurement result of an NR cell.

In one subembodiment of the above embodiment, the second sub-information comprises a measurement result of BT.

In one subembodiment of the above embodiment, the second sub-information comprises a measurement result of WLAN.

In one subembodiment of the above embodiment, the second sub-information comprises a measurement result of Code Division Multiple Access (CDMA).

In one subembodiment of the above embodiment, the second sub-information comprises a measurement result of GSM EDGE Radio Access Network (GERAN).

In one subembodiment of the above embodiment, the measurement result comprises Reference Signal Received Power (RSRP).

In one subembodiment of the above embodiment, the measurement result comprises Reference Signal Received Quality (RSRQ).

In one subembodiment of the above embodiment, the measurement result comprises a Received Signal Strength Indicator (RSSI).

In one subembodiment of the above embodiment, the measurement result comprises a Signal to Noise and Interference Ratio (SINR).

In one subembodiment of the above embodiment, the measurement result comprises a Channel Status Information reference signal resource indicator (CRI).

In one subembodiment of the above embodiment, the second sub-information comprises a measResultServingCell.

In one subembodiment of the above embodiment, the second sub-information comprises a measResultNeighCellList.

In one subembodiment of the above embodiment, the second sub-information comprises a measResultListGERAN.

In one subembodiment of the above embodiment, the second sub-information comprises measResultsCDMA2000.

In one subembodiment of the above embodiment, the second sub-information comprises a measResultLastServCell.

In one subembodiment of the above embodiment, the second sub-information comprises a measResultFreqList.

In one subembodiment of the above embodiment, the second sub-information comprises measResultFreqListEUTRA.

In one subembodiment of the above embodiment, the second sub-information comprises a measResultSCG.

In one subembodiment of the above embodiment, the second sub-information comprises measResultSCG-EUTRA.

In one subembodiment of the above embodiment, the second sub-information comprises a measResultFreqList.

In one subembodiment of the above embodiment, the second sub-information comprises a measResultSCG-Failure.

In one subembodiment of the above embodiment, the second sub-information comprises locationInfo.

In one subembodiment of the above embodiment, the second sub-information comprises a measResultFreqListMRDC.

In one subembodiment of the above embodiment, the second sub-information comprises a measResultSCG-FailureMRDC.

In one subembodiment of the above embodiment, the second sub-information comprises logMeasResultListBT.

In one subembodiment of the above embodiment, the second sub-information comprises logMeasResultListWLAN.

In one embodiment, the phrase that the first failure message comprises the first failure sub-message comprises that the first failure message comprises all of information in the first failure sub-message.

In one embodiment, the phrase that the first failure message comprises the first failure sub-message comprises that the first failure message comprises part of information in the first failure sub-message.

In one embodiment, the phrase that the first failure message comprises the first failure sub-message comprises that the first failure message has same information as the first failure sub-message.

In one subembodiment of the above embodiment, the phrase that the first failure message has same information as the first failure sub-message comprises that the first failure message has a same field as the first failure sub-message.

In one subembodiment of the above embodiment, the phrase that the first failure message has same information as the first failure sub-message comprises that a value of a field in the first failure message is the same as a value of a field in the first failure sub-message.

In one embodiment, the phrase that the first condition set comprises a phrase for determining that the radio connection failure occurs in the first cell comprises: the phrase for determining that the radio connection failure occurs in the first cell is one condition in the first condition set.

In one embodiment, the phrase that the first condition set comprises a phrase for determining that the radio connection failure occurs in the first cell comprises: the phrase for determining that the radio connection failure occurs in the first cell is used for determining the first condition set.

In one embodiment, the phrase that the first condition set comprises a phrase for determining the radio connection failure in the first cell comprises: one of the K first-type condition(s) in the first condition set comprises determining that the radio connection failure occurs in the first cell.

In one embodiment, the phrase that the first signaling is used for triggering the third signaling comprises: the third signaling is a response to the first signaling.

In one embodiment, the phrase that the first signaling is used for triggering the third signaling comprises: as a response to transmitting the first signaling, the third signaling is received.

In one embodiment, the phrase that the second signaling is used for triggering the third signaling comprises: the third signaling is a response to the second signaling.

In one embodiment, the phrase that the second signaling is used for triggering the third signaling comprises: as a response to transmitting the second signaling, the third signaling is received.

In one embodiment, the first signaling is different from the second signaling.

In one embodiment, the third signaling received when the first condition set is satisfied is different from the third signaling received when the first condition set is not satisfied.

Embodiment 2

Figure 2:
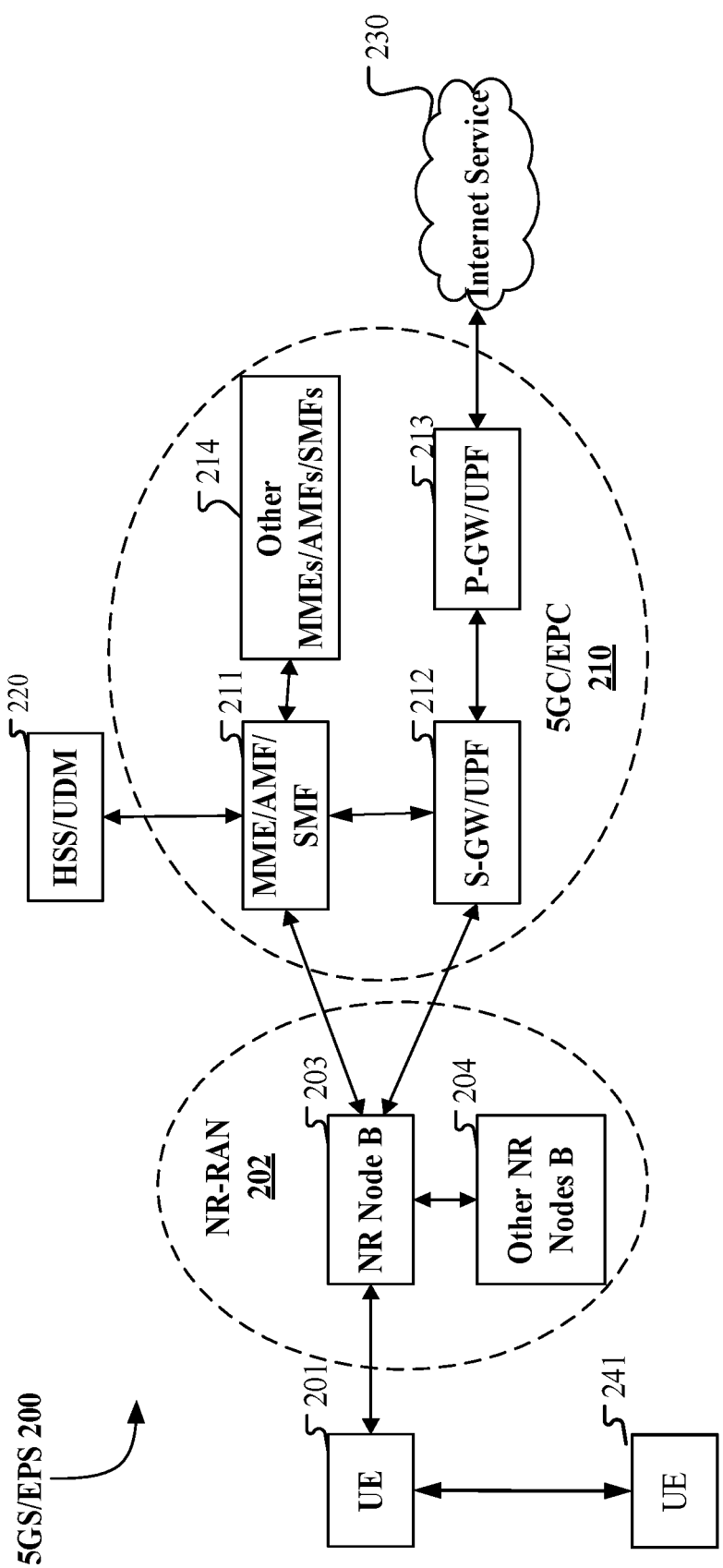
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 supports communications within Non-Terrestrial Networks (NTN).

In one embodiment, the UE 201 supports communications within Large-Delay-Inequality networks.

In one embodiment, the UE 201 supports communications within Terrestrial Networks (NTN).

In one embodiment, the UE 201 supports communications in Dual-Connectivity (DC).

In one embodiment, the UE 201 supports Sidelink communications.

In one embodiment, the UE 201 is a UE.

In one embodiment, the UE 201 is an aircraft.

In one embodiment, the UE 201 is a vehicle terminal.

In one embodiment, the UE 201 is a relay.

In one embodiment, the UE 201 is a vessel.

In one embodiment, the UE 201 is a IoT terminal.

In one embodiment, the UE 201 is an Industrial IoT terminal.

In one embodiment, the UE 201 is a device that supports transmission with low-latency and high-reliability.

In one embodiment, the gNB 203 corresponds to the second node in the present disclosure.

In one embodiment, the gNB 203 corresponds to the third node in the present disclosure.

In one embodiment, the gNB 203 corresponds to the fourth node in the present disclosure.

In one embodiment, the gNB 203 supports communications within NTN.

In one embodiment, the gNB 203 supports communications within Large-Delay-Inequality networks.

In one embodiment, the gNB 203 supports communications within TN.

In one embodiment, the gNB 203 is a Marco Cellular base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station that supports large delay inequality.

In one embodiment, the gNB 203 is a flying platform equipment.

In one embodiment, the gNB 203 is a satellite equipment.

In one embodiment, the gNB 203 is a UE.

In one embodiment, the gNB 203 is a gateway.

Embodiment 3

Figure 3:
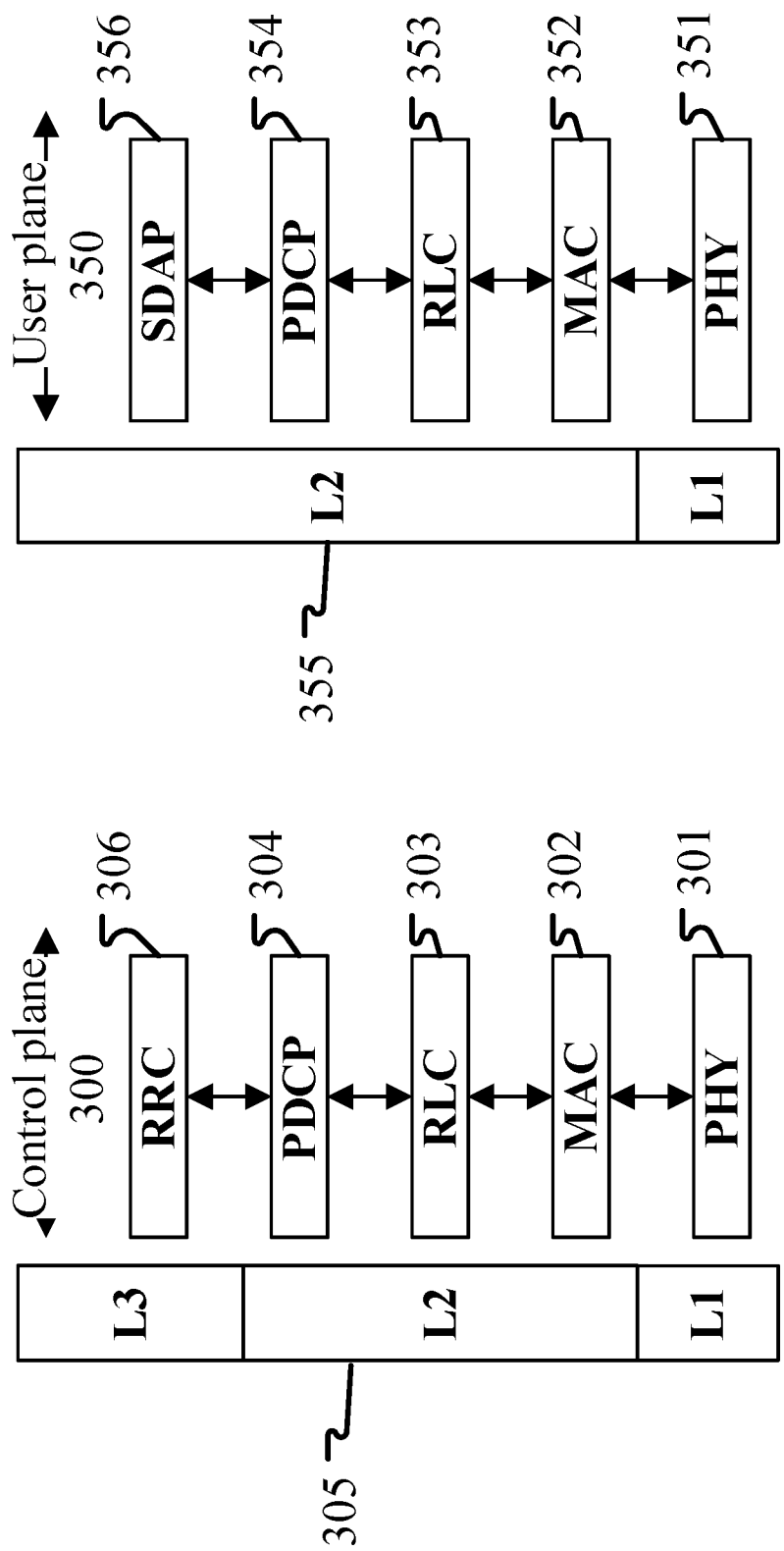
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for the control plane 300 is represented by three layers, which are a layer 1, a layer 2 and a layer 3, respectively. The layer 1 (L1) is the lowest layer and performs signal processing functions of various PHY layers. The L1 is called PHY 301 in the present disclosure. L2 305, above the PHY 301, comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a data packet and provides support for handover. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating various radio resources (i.e., resources block) in a cell. The MAC sublayer 302 is also in charge of HARQ operation. The RRC sublayer 306 in L3 layer of the control plane 300 is responsible for acquiring radio resources (i.e., radio bearer) and configuring the lower layer with an RRC signaling. The radio protocol architecture of the user plane 350 comprises layer 1 (L1) and layer 2 (L2). In the user plane 350, the radio protocol architecture is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the radio protocol architecture in FIG. 3 is applicable to the fourth node in the present disclosure.

In one embodiment, the first signaling in the present disclosure is generated by the RRC 306.

In one embodiment, the second signaling in the present disclosure is generated by the RRC 306.

In one embodiment, the third signaling in the present disclosure is generated by the RRC 306.

In one embodiment, the fourth signaling in the present disclosure is generated by the RRC 306.

In one embodiment, the fifth signaling in the present disclosure is generated by the RRC 306.

In one embodiment, the first message in the present disclosure is generated by the RRC 306.

Embodiment 4

Figure 4:
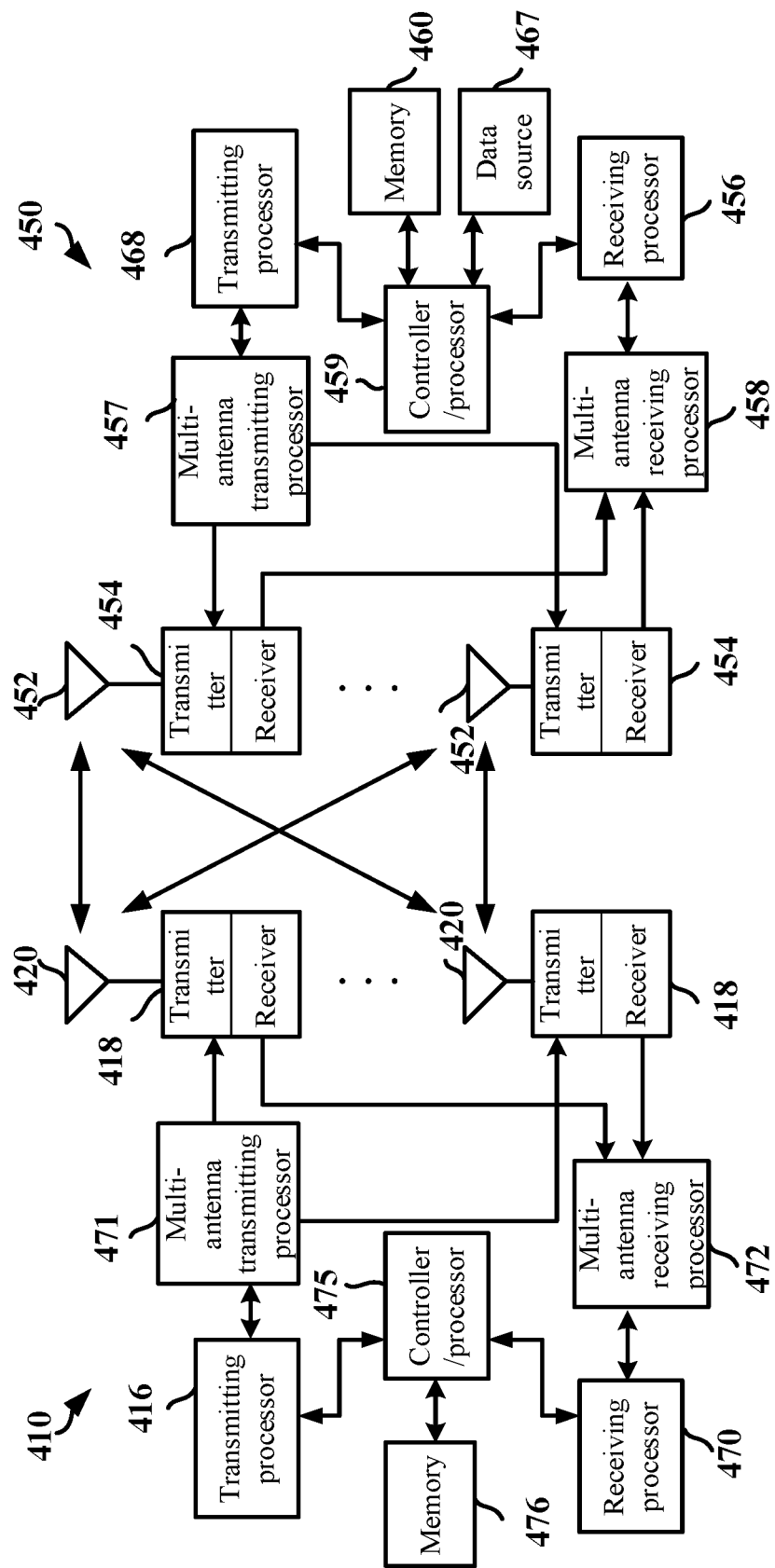
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least determines that a radio connection failure occurs in a first cell, as a response to determining that the radio connection failure occurs in the first cell, generates a first failure message; when the first condition set is satisfied, transmits a first signaling; when the first condition set is not satisfied, transmits a second signaling; and receives a third signaling; herein, the first signaling is used for initiating a radio connection recovery performed on the first cell, the first signaling comprises a first failure sub-message; the first failure message comprises the first failure sub-message; the second signaling is used for requesting a radio resource control reestablishment; the first condition set comprises a phrase for determining that the radio connection failure occurs in the first cell; the third signaling is used for updating a radio connection; when the first condition set is satisfied, the first signaling is used for triggering the third signaling, and when the first condition set is not satisfied, the second signaling is used for triggering the third signaling.

In one embodiment, the first communication device 450 comprises a memory that stores a computer readable instruction program. The computer readable instruction program generates an action when executed by at least one processor. The action includes: determining that a radio connection failure occurs in a first cell, as a response to determining that the radio connection failure occurs in the first cell, generating a first failure message; when the first condition set is satisfied, transmitting a first signaling; when the first condition set is not satisfied, transmitting a second signaling; and receiving a third signaling; herein, the first signaling is used for initiating a radio connection recovery performed on the first cell, the first signaling comprises a first failure sub-message; the first failure message comprises the first failure sub-message; the second signaling is used for requesting a radio resource control reestablishment; the first condition set comprises a phrase for determining that the radio connection failure occurs in the first cell; the third signaling is used for updating a radio connection; when the first condition set is satisfied, the first signaling is used for triggering the third signaling, and when the first condition set is not satisfied, the second signaling is used for triggering the third signaling.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: when the first condition set is satisfied, receives a first signaling; when the first condition set is not satisfied, receives a second signaling; and transmits a third signaling; herein, as a response to determining that the radio connection failure occurs in the first cell, a first failure message is generated; the first signaling is used for initiating a radio connection recovery performed on the first cell, the first signaling comprises a first failure sub-message; the first failure message comprises the first failure sub-message; the second signaling is used for requesting a radio resource control reestablishment; the first condition set comprises a phrase for determining that the radio connection failure occurs in the first cell; the third signaling is used for updating a radio connection; when the first condition set is satisfied, the first signaling is used for triggering the third signaling, and when the first condition set is not satisfied, the second signaling is used for triggering the third signaling.

In one embodiment, the second communication device 410 comprises a memory that stores a computer readable instruction program. The computer readable instruction program generates an action when executed by at least one processor. The action includes: when the first condition set is satisfied, receiving a first signaling; when the first condition set is not satisfied, receiving a second signaling; and transmitting a third signaling; herein, as a response to determining that the radio connection failure occurs in the first cell, a first failure message is generated; the first signaling is used for initiating a radio connection recovery performed on the first cell, the first signaling comprises a first failure sub-message; the first failure message comprises the first failure sub-message; the second signaling is used for requesting a radio resource control reestablishment; the first condition set comprises a phrase for determining that the radio connection failure occurs in the first cell; the third signaling is used for updating a radio connection; when the first condition set is satisfied, the first signaling is used for triggering the third signaling, and when the first condition set is not satisfied, the second signaling is used for triggering the third signaling.

In one embodiment, the antenna 452, the transmitter 454, the transmitting processor 468, and the controller/processor 459 are used for transmitting a first signaling; at least one of the antenna 420, the receiver 418, the receiving processor 470, or the controller/processor 475 is used for receiving a first signaling.

In one embodiment, the antenna 452, the transmitter 454, the transmitting processor 468, and the controller/processor 459 are used for transmitting a second signaling; at least one of the antenna 420, the receiver 418, the receiving processor 470, or the controller/processor 475 is used for receiving a second signaling.

In one embodiment, the antenna 452, the receiver 454, the receiving processor 456, and the controller/processor 459 are used for receiving a third signaling; at least one of the antenna 420, the transmitter 418, the transmitting processor 416, or the controller/processor 475 is used for transmitting a third signaling.

In one embodiment, the antenna 452, the transmitter 454, the transmitting processor 468, and the controller/processor 459 are used for transmitting a fourth signaling; at least one of the antenna 420, the receiver 418, the receiving processor 470, or the controller/processor 475 is used for receiving a fourth signaling.

In one embodiment, the antenna 452, the transmitter 454, the transmitting processor 468, and the controller/processor 459 are used for transmitting a fifth signaling; at least one of the antenna 420, the receiver 418, the receiving processor 470, or the controller/processor 475 is used for receiving a fifth signaling.

In one embodiment, the antenna 452, the receiver 454, the receiving processor 456, and the controller/processor 459 are used for receiving a first message; at least one of the antenna 420, the transmitter 418, the transmitting processor 416, or the controller/processor 475 is used for transmitting a first message.

In one embodiment, the first communication device 450 corresponds to a first node in the present disclosure.

In one embodiment, the second communication device 410 corresponds to a second node in the present disclosure.

In one embodiment, the second communication device 410 corresponds to a third node in the present disclosure.

In one embodiment, the second communication device 410 corresponds to a fourth node in the present disclosure.

In one embodiment, the first communication device 450 is a UE.

In one embodiment, the first communication device 450 is a UE that supports large delay inequality.

In one embodiment, the first communication device 450 is a UE that supports NTN.

In one embodiment, the first communication device 450 is an aircraft device.

In one embodiment, the first communication device 450 has a positioning capability.

In one embodiment, the first communication device 450 does not have a positioning capability.

In one embodiment, the first communication device 450 is a UE that supports TN.

In one embodiment, the second communication device 410 is a base station (gNB/eNB/ng-eNB).

In one embodiment, the second communication device 410 is a base station that supports large delay inequality.

In one embodiment, the second communication device 410 is a base station that supports NTN.

In one embodiment, the second communication device 410 is a satellite equipment.

In one embodiment, the second communication device 410 is a flying platform equipment.

In one embodiment, the second communication device 410 is a base station that supports TN.

Embodiment 5

Figure 5:
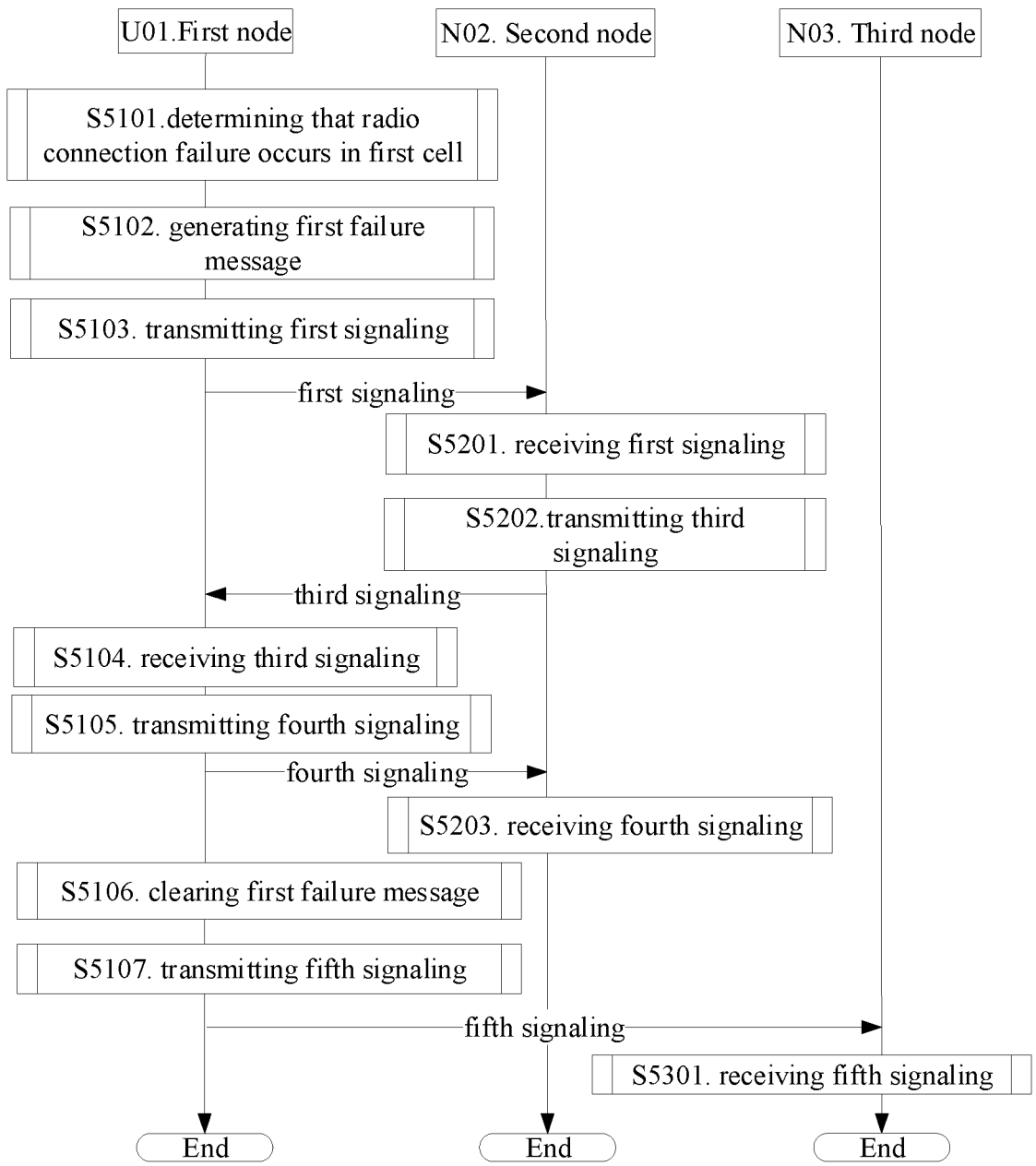
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. A first node U01 is a UE; a second node N02 is a base station; a third node N03 is another base station; particularly, the order of steps in the embodiment does not limit the order of signal transmission and implementation in the present disclosure.

The first node U01 determines that a radio connection failure occurs in a first cell in step S5101, generates a first failure message in step S5102, when a first condition set is satisfied, transmits a first signaling in step S5103, receives a third signaling in step S5104, transmits a fourth signaling in step S5105, clears the first failure message in step S5106, and transmits a fifth signaling in step S5107.

The second node N02 receives a first signaling in step S5201, transmits a third signaling in step S5202, and receives a fourth signaling in step S5203.

The third node N03 receives a fifth signaling in step S5301.

In Embodiment 5, as a response to determining that the radio connection failure occurs in the first cell, a first failure message is generated; the first signaling is used for initiating a radio connection recovery performed on the first cell, the first signaling comprises a first failure sub-message; the first failure message comprises the first failure sub-message; the first condition set comprises a phrase for determining that the radio connection failure occurs in the first cell; the third signaling is used for updating a radio connection; when the first condition set is satisfied, the first signaling is used for triggering the third signaling; the fourth signaling comprises information in the first failure message at least other than the first failure sub-message; the third signaling comprises a first field, and a first field in the third signaling is used for triggering the fourth signaling; when the fourth signaling is triggered by the third signaling, the fourth signaling does not comprise the first failure sub-message; the first failure message is cleared; the fifth signaling is used for performing a confirmation on the third signaling; and the fifth signaling indicates whether the first failure message is available.

In one embodiment, the first node U01 comprises a UE.

In one embodiment, the first node U01 comprises an Ender.

In one embodiment, the second node N02 comprises a base station that maintains connection when a radio connection failure occurs in a first cell.

In one embodiment, the second node N02 comprises a maintenance base station of a PSCell.

In one embodiment, the second node N02 comprises an SCG.

In one embodiment, the second node N02 comprises an SN.

In one embodiment, the third node N03 comprises a maintenance base station of a source cell.

In one embodiment, the third node N03 comprises an MN.

In one embodiment, the third node N03 comprises a maintenance base station of a target cell.

In one embodiment, the third node N03 is a maintenance base station of the first cell.

In one embodiment, the third node N03 is the same as the second node N02.

In one embodiment, the third node N03 is different from the second node N02.

In one embodiment, the first cell comprises a PCell.

In one embodiment, the first cell comprises an MCG.

In one embodiment, the first cell comprises a PSCell.

In one embodiment, the first cell comprises an SCG.

In one embodiment, when the first signaling is transmitted, the second signaling in the present disclosure is not transmitted.

In one embodiment, the phrase that the fourth signaling is triggered by the third signaling comprises: after the third signaling is received, the fourth signaling is transmitted.

In one embodiment, the phrase that the fourth signaling is triggered by the third signaling comprises: the fourth signaling is a response to the third signaling.

In one embodiment, the phrase that the fourth signaling is triggered by the third signaling comprises: the third signaling is used for triggering the fourth signaling.

In one embodiment, the phrase that the third signaling comprises a first field comprises: the first field is one or more fields in the third signaling.

In one embodiment, the phrase that a first field in the third signaling is used for triggering the fourth signaling comprises: there exists the first field in the third signaling used for triggering the fourth signaling.

In one embodiment, the phrase that a first field in the third signaling is used for triggering the fourth signaling comprises: the first field in the third signaling being configured as a truth-value is used for triggering the fourth signaling.

In one subembodiment of the above embodiment, the truth-value comprises true.

In one subembodiment of the above embodiment, the truth-value comprises 1.

In one embodiment, a receiver of the fourth signaling comprises a receiver of the first signaling.

In one embodiment, a receiver of the fourth signaling comprises a receiver of the second signaling.

In one embodiment, a receiver of the fourth signaling comprises a maintenance base station of the first cell.

In one embodiment, the fourth signaling is transmitted via an air interface.

In one embodiment, the fourth signaling is transmitted via a radio interface.

In one embodiment, the fourth signaling is transmitted via a high-layer signaling.

In one embodiment, the fourth signaling comprises a higher-layer signaling.

In one embodiment, the fourth signaling comprises all or part of a high-layer signaling.

In one embodiment, the fourth signaling comprises an RRC message.

In one embodiment, the fourth signaling comprises all or part of IEs of an RRC message.

In one embodiment, the fourth signaling comprises all or part of fields in an IE in an RRC message.

In one embodiment, the fourth signaling comprises a DL signaling.

In one embodiment, a signaling radio bearer of the fourth signaling comprises SRB1.

In one embodiment, a signaling radio bearer of the fourth signaling comprises SRB2.

In one embodiment, a signaling radio bearer of the fourth signaling comprises SRB3.

In one embodiment, a logical channel carrying the fourth signaling comprises a DCCH.

In one embodiment, the fourth signaling comprises a UEInformationResponse message.

In one embodiment, the fourth signaling comprises an RLF-Report.

In one embodiment, the fourth signaling comprises an RA-Report.

In one embodiment, the fourth signaling comprises an nr-RLF-Report.

In one embodiment, the fourth signaling comprises a eutra-RLF-Report.

In one embodiment, the fourth signaling comprises a measResultLastServCell.

In one embodiment, the fourth signaling comprises measResultNeighCells.

In one embodiment, the fourth signaling comprises a c-RNTI.

In one embodiment, the fourth signaling comprises a previousPCellId.

In one embodiment, the fourth signaling comprises a failedPCellId.

In one embodiment, the fourth signaling comprises a reestablishmentCellId.

In one embodiment, the fourth signaling comprises a timeConnFailure.

In one embodiment, the fourth signaling comprises a timeSinceFailure.

In one embodiment, the fourth signaling comprises a connectionFailureType.

In one embodiment, the fourth signaling comprises a rlf-Cause.

In one embodiment, the fourth signaling comprises locationInfo.

In one embodiment, the fourth signaling comprises a perRAInfoList.

In one embodiment, the phrase that the fourth signaling comprises information in the first failure message at least other than the first failure sub-message comprises that the fourth signaling comprises information in the first failure message, but does not comprise information in the first failure sub-message.

In one embodiment, the phrase that the fourth signaling comprises information in the first failure message at least other than the first failure sub-message comprises that the fourth signaling does not comprise an overlapping part between the first failure message and the first failure sub-message.

In one embodiment, the phrase that the fourth signaling comprises information in the first failure message at least other than the first failure sub-message comprises that removing information the same as the first failure sub-message out of the first failure message is used for determining the fourth signaling.

In one embodiment, the phrase that the fourth signaling does not comprise the first failure sub-message comprises the phrase that the fourth signaling comprises information in the first failure message at least other than the first failure sub-message.

In one embodiment, the updating a radio connection comprises a radio resource control connection re-configuration.

In one embodiment, the phrase when the fourth signaling is triggered by the third signaling comprises the phrase that the updating a radio connection comprises a radio resource control connection reconfiguration.

In one embodiment, the phrase that the updating a radio connection comprises a radio resource control connection re-configuration comprises that the third signaling is used for initiating an RRC connection Reconfiguration.

In one embodiment, the phrase that the updating a radio connection comprises a radio resource control connection re-configuration comprises that the third signaling comprises an RRCReconfiguration message.

In one embodiment, the phrase that the updating a radio connection comprises a radio resource control connection re-configuration comprises that the third signaling comprises an RRCConnectionReconfiguration message.

In one embodiment, when a first failure message is successfully reported, the first failure message is cleared.

In one subembodiment of the above embodiment, the phrase that the first failure message is successfully reported comprises that the fourth signaling is successfully transmitted.

In one subembodiment of the above embodiment, the phrase that the first failure message is successfully reported comprises that the fifth signaling is successfully transmitted.

In one subembodiment of the above embodiment, the phrase that the first failure message is successfully reported comprises that the first failure message is transmitted.

In one embodiment, the phrase that the first failure message is cleared comprises that all of information stored in the first failure message is cleared.

In one embodiment, the phrase that the first failure message is cleared comprises that part of information stored in the first failure message is cleared.

In one embodiment, the meaning of the being cleared comprises being deleted.

In one embodiment, the meaning of being cleared comprises being discarded.

In one embodiment, the meaning of the being cleared comprises being released.

In one embodiment, as a response to transmitting the first signaling, the first failure message is cleared.

In one embodiment, as a response to transmitting the fourth signaling, the first failure message is cleared.

In one embodiment, a receiver of the fifth signaling comprises the second node N02.

In one embodiment, a receiver of the fifth signaling comprises the third node N03.

In one embodiment, a receiver of the fifth signaling comprises a handover target cell.

In one embodiment, the fifth signaling is transmitted via an air interface.

In one embodiment, the fifth signaling is transmitted via a radio interface.

In one embodiment, the fifth signaling is transmitted via a high-layer signaling.

In one embodiment, the fifth signaling comprises a higher-layer signaling.

In one embodiment, the fifth signaling comprises all or part of a high-layer signaling.

In one embodiment, the fifth signaling comprises an RRC message.

In one embodiment, the fifth signaling comprises all or part of IEs of an RRC message.

In one embodiment, the fifth signaling comprises all or part of fields in an IE in an RRC message.

In one embodiment, the fifth signaling comprises a UL signaling.

In one embodiment, a signaling radio bearer of the fifth signaling comprises SRB0.

In one embodiment, a signaling radio bearer of the fifth signaling comprises SRB1.

In one embodiment, a signaling radio bearer of the fifth signaling comprises SRB3.

In one embodiment, a signaling radio bearer of the fifth signaling comprises a Sidelink SRB.

In one embodiment, a signaling radio bearer of the fifth signaling comprises PC5-RRC.

In one embodiment, a logical channel carrying the fifth signaling comprises a DCCH.

In one embodiment, a logical channel carrying the fifth signaling comprises a SCCH.

In one embodiment, the fifth signaling comprises an RRCReconfigurationComplete message.

In one embodiment, the fifth signaling comprises an RRCConnectionReconfigurationComplete message.

In one embodiment, the fifth signaling comprises an RRCReconfigurationCompleteSidelink message.

In one embodiment, the phrase that the fifth signaling indicates whether the first failure message is available comprises that the fifth signaling indicates that the first failure message is available.

In one embodiment, the phrase that the fifth signaling indicates whether the first failure message is available comprises that the fifth signaling indicates that the first failure message is not available.

In one embodiment, the phrase that the fifth signaling indicates whether the first failure message is available comprises that the fifth signaling indicates whether the first failure message exists.

In one embodiment, the phrase that the fifth signaling indicates whether the first failure message is available comprises that the fifth signaling indicates whether the first failure message is stored in the VarRLF-Report.

In one embodiment, the phrase that the fifth signaling indicates whether the first failure message is available comprises that the fifth signaling comprising rlf-InfoAvailable is used for indicating that the first failure message is available.

In one embodiment, the phrase that the fifth signaling indicates whether the first failure message is available comprises that the fifth signaling not comprising rlf-InfoAvailable is used for indicating that the first failure message is not available.

In one embodiment, the phrase that the fifth signaling indicates whether the first failure message is available comprises that a value of rlf-InfoAvailable in the fifth signaling being a truth value is used for indicating that the first failure message is available.

In one embodiment, the phrase that the fifth signaling indicates whether the first failure message is available comprises that a value of rlf-InfoAvailable in the fifth signaling being a non-truth-value is used for indicating that the first failure message is not available.

In one embodiment, the fifth signaling is used for indicating that the first failure message is not available.

In one embodiment, the fifth signaling does not comprise the rlf-InfoAvailable.

Embodiment 6

Figure 6:
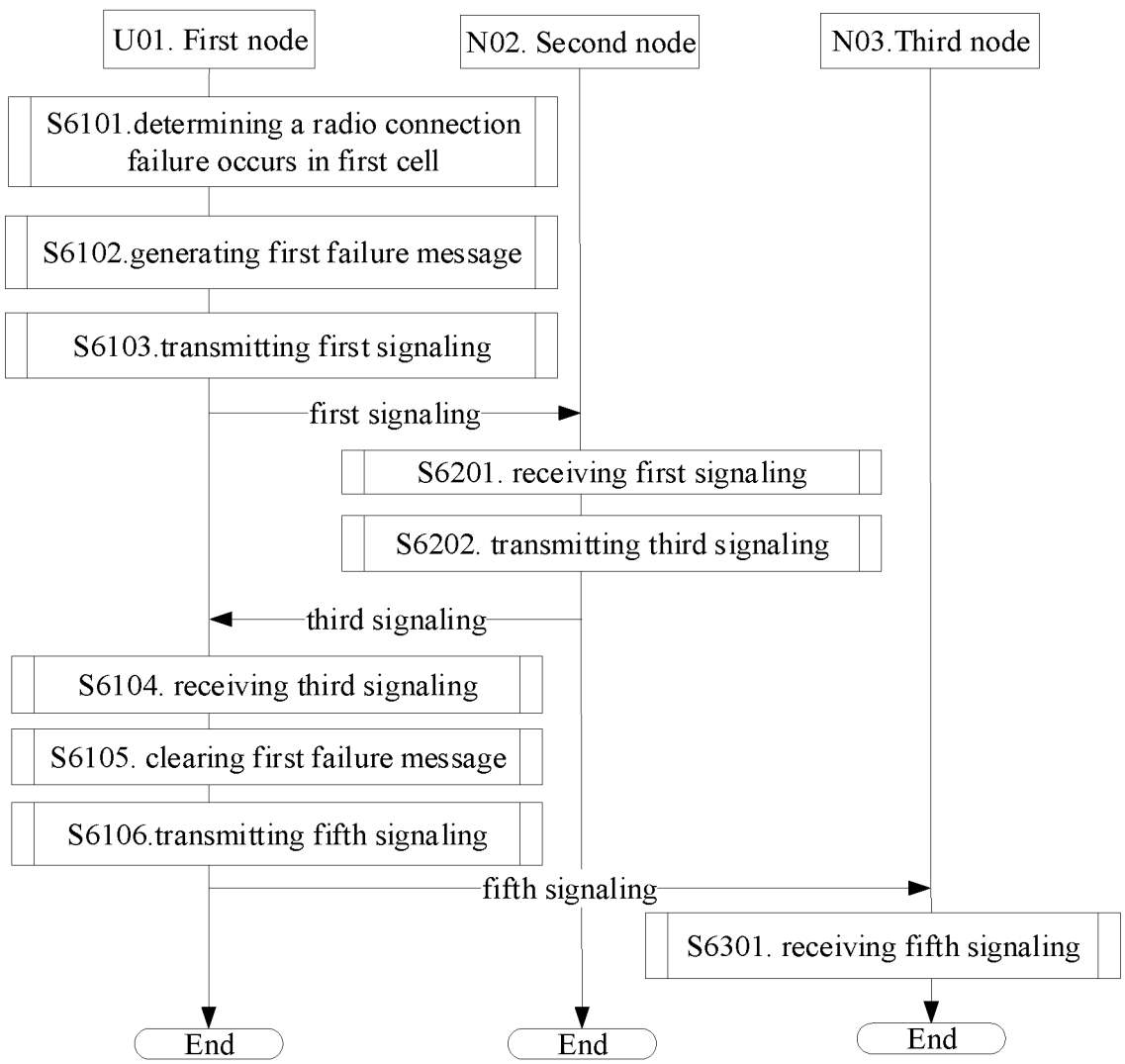
FIG. 6 illustrates a flowchart of radio signal transmission according to another embodiment of the present disclosure.

Embodiment 6 illustrates a flowchart of radio signal transmission according to another embodiment of the present disclosure, as shown in FIG. 6. A first node U01 is a UE, and a second node N02 is a base station; a third node N03 is another base station; particularly, the order of steps in the embodiment does not limit the order of signal transmission and implementation in the present disclosure.

The first node U01 determines that a radio connection failure occurs in a first cell in step S6101, generates a first failure message in step S6102, when a first condition set is satisfied, transmits a first signaling in step S6103, receives a third signaling in step S6104, clears a first failure message in step S6105, and transmits a fifth signaling in step S6106.

The second node N02 receives a first signaling in step S6201, and transmits a third signaling in step S6202.

The third node N03 receives a fifth signaling in step S6301.

In Embodiment 6, as a response to determining that the radio connection failure occurs in the first cell, a first failure message is generated; the first signaling is used for initiating a radio connection recovery performed on the first cell, the first signaling comprises a first failure sub-message; the first failure message comprises the first failure sub-message; the first condition set comprises a phrase for determining that the radio connection failure occurs in the first cell; the third signaling is used for updating a radio connection; when the first condition set is satisfied, the first signaling is used for triggering the third signaling; the first failure message is cleared; the fifth signaling is used for performing a confirmation on the third signaling; and the fifth signaling indicates whether the first failure message is available.

In one embodiment, the second node N02 comprises a base station that maintains connection when a radio connection failure occurs in a first cell.

In one embodiment, the second node N02 comprises an SN.

In one embodiment, the third node comprises an MN.

In one embodiment, the third node comprises a target cell.

In one embodiment, when the first signaling is transmitted, the second signaling in the present disclosure is not transmitted.

In one embodiment, the first signaling comprises an MCGFailureInformation message.

In one embodiment, the first signaling comprises an SCGFailureInformation message.

In one embodiment, the third signaling comprises an RRCReconfiguration message.

In one embodiment, the third signaling comprises an RRCConnectionReconfiguration message.

In one embodiment, the third signaling comprises an RRCRelease message.

In one embodiment, the third signaling comprises an RRCConnectionRelease message.

In one embodiment, when the first failure sub-message is successfully reported, the first failure message is cleared.

In one subembodiment of the above embodiment, the phrase that the first failure sub-message is successfully reported comprises that the first signaling is successfully transmitted.

In one subembodiment of the above embodiment, the phrase that the first failure sub-message is successfully reported comprises: as a response to the first signaling, the third signaling is successfully received.

In one subembodiment of the above embodiment, the phrase that the first failure sub-message is successfully reported comprises that MCGFailureInformation is successfully transmitted.

In one subembodiment of the above embodiment, the phrase that the first failure sub-message is successfully reported comprises that an RRC message is received after MCGFailureInformation is transmitted.

In one embodiment, the first failure sub-message comprises one or more fields in MCGFailureInformation.

In one embodiment, the first failure sub-message comprises a FailureReportMCG.

In one subembodiment of the above embodiment, the second sub-information comprises a perRAInfoList.

In one embodiment, the first failure sub-message comprises a VarRLF-Report.

In one embodiment, the first failure sub-message comprises an RA-ReportList.

In one embodiment, the first failure sub-message comprises one or more fields in UEInformationResponse.

In one embodiment, the first failure sub-message comprises all of information in a VarRLF-Report.

In one embodiment, the first failure sub-message comprises part of information in a VarRLF-Report.

In one embodiment, the first failure sub-message is equivalent to the first failure message.

In one subembodiment of the above embodiment, the meaning of the being equivalent comprises being the same.

In one subembodiment of the above embodiment, the meaning of the being equivalent comprises that the first failure sub-message is inferred from the first failure message.

In one embodiment, the fifth signaling comprises an RRCReconfigurationComplete message.

In one embodiment, the fifth signaling comprises an RRCConnectionReconfigurationComplete message.

In one embodiment, the fifth signaling comprises an RRCSetupRequest message.

In one embodiment, the fifth signaling comprises an RRCConnectionSetupRequest message.

In one embodiment, the fifth signaling does not comprise rlf-InfoAvailable.

Embodiment 7

Figure 7:
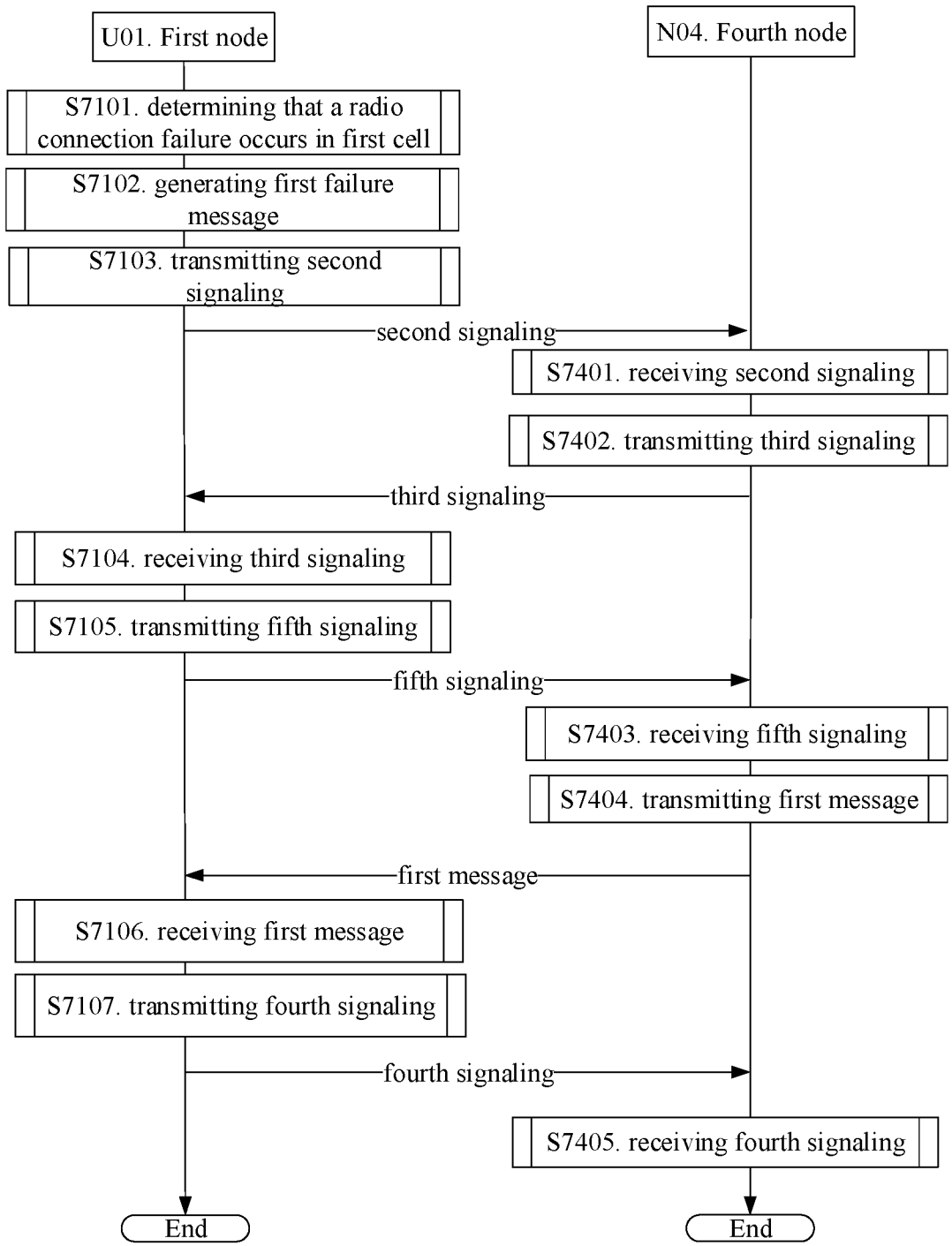
FIG. 7 illustrates a flowchart of radio signal transmission according to another embodiment of the present disclosure.

Embodiment 7 illustrates a flowchart of radio signal transmission according to another embodiment in the present disclosure, as shown in FIG. 7. The first node U01 is a UE, a fourth node N04 is a base station; particularly, the order of steps in the embodiment does not limit the order of signal transmission and implementation in the present disclosure.

The first node U01 determines that a radio connection failure occurs in a first cell in step S7101, generates a first failure message in step S7102, when the first condition set is not satisfied, transmits a second signaling in step S7103, receives a third signaling in step S7104, transmits a fifth signaling in step S7105, receives a first message in step S7106, and transmits a fourth signaling in step S7107.

The fourth node N04 receives a second signaling in step S7401, transmits a third signaling in step S7401, receives a fifth signaling in step S7403, transmits a first message in step S7404, and receives a fourth signaling in step S7405.

In Embodiment 7, as a response to determining that the radio connection failure occurs in the first cell, a first failure message is generated; the second signaling is used for requesting a radio resource control reestablishment; the first condition set comprises a phrase for determining that the radio connection failure occurs in the first cell; the third signaling is used for updating a radio connection; when the first condition set is not satisfied, the second signaling is used for triggering the third signaling; when the fourth signaling is triggered by a first message, the fourth signaling comprises the first failure sub-message; the fifth signaling is used for performing a confirmation on the third signaling; and the fifth signaling indicates whether the first failure message is available.

In one embodiment, when the second signaling is transmitted, the first signaling in the present disclosure is not transmitted.

In one embodiment, the second signaling comprises an RRC Reestablishment Request.

In one embodiment, the second signaling comprises an RRC Connection Reestablishment Request.

In one embodiment, the third signaling comprises an RRC Reestablishment message.

In one embodiment, the third signaling comprises an RRC Connection Reestablishment message.

In one embodiment, the fourth node N04 comprises a maintenance base station of a cell determined by a cell selection performed by the first node U01.

In one embodiment, a receiver of the fourth signaling comprises a transmitter of the first message.

In one embodiment, the phrase that the fourth signaling is triggered by a first message comprises that when the first message is received, the fourth signaling is transmitted.

In one embodiment, the phrase that the fourth signaling is triggered by a first message comprises that the fourth signaling is a response to the first message.

In one embodiment, the phrase that the fourth signaling is triggered by a first message comprises that the first message triggers the fourth signaling.

In one embodiment, the phrase that the fourth signaling comprises the first failure sub-message comprises that the fourth signaling comprises all of the first failure sub-message.

In one embodiment, the phrase that the fourth signaling comprises the first failure sub-message comprises that the fourth signaling comprises part of the first failure sub-message.

In one embodiment, the phrase that the fourth signaling comprises the first failure sub-message comprises that the fourth signaling comprises an overlapping part between the first failure message and the first failure sub-message.

In one embodiment, the phrase that the fourth signaling comprises the first failure sub-message comprises that the fourth signaling comprises the first failure message, and the first failure message comprises part of the first failure sub-message.

In one embodiment, the phrase that the fourth signaling comprises the first failure sub-message comprises that the first failure sub-message is not generated.

In one embodiment, when the first condition set is not satisfied, the first failure sub-message is not generated.

In one embodiment, the first message comprises a higher-layer signaling.

In one embodiment, the first message comprises an RRC message.

In one embodiment, the first message is used for requesting UE information.

In one embodiment, the first message is used for requesting an RLF report.

In one embodiment, the first message is used for requesting an RA report.

In one embodiment, the first message comprises a UEInformationRequest message.

In one embodiment, the first message comprises an RLF-ReportReq IE.

In one embodiment, the first message comprises a rlf-ReportReq field.

In one embodiment, the first message comprises a ra-ReportReq.

In one embodiment, the fourth signaling comprises a UEInformationResponse message.

In one embodiment, the fourth signaling comprises an RLF-Report.

In one embodiment, the phrase that the fourth signaling is triggered by a first message comprises that when the first message is received, the fourth signaling is transmitted.

In one embodiment, the phrase that the fourth signaling is triggered by a first message comprises that the first message comprises a UEInformationRequest, the UEInformationRequest comprises a rlf-ReportReq, and a value of the rlf-ReportReq is configured as true.

In one embodiment, the phrase that the fourth signaling is triggered by a first message comprises that the fourth signaling is a response to the first message.

In one embodiment, the phrase that the fourth signaling comprises the first failure sub-message comprises that the fourth signaling comprises all of fields in the first failure sub-message.

In one embodiment, the phrase that the fourth signaling comprises the first failure sub-message comprises that the fourth signaling comprises part of fields in the first failure sub-message.

In one embodiment, the fifth signaling comprises an RRCReestablishmentComplete message.

In one embodiment, the fifth signaling comprises an RRCConnectionReestablishmentComplete message.

In one embodiment, the phrase that the fifth signaling indicates whether the first failure message is available comprises that the fifth signaling is used for indicating that the first failure message is available.

In one embodiment, the phrase that the fifth signaling indicates whether the first failure message is available comprises that the fifth signaling comprises rlf-InfoAvailable, and the rlf-InfoAvailable is used for indicating that the first failure message is available.

In one embodiment, the fifth signaling comprises the rlf-InfoAvailable.

Embodiment 8

Figure 8:
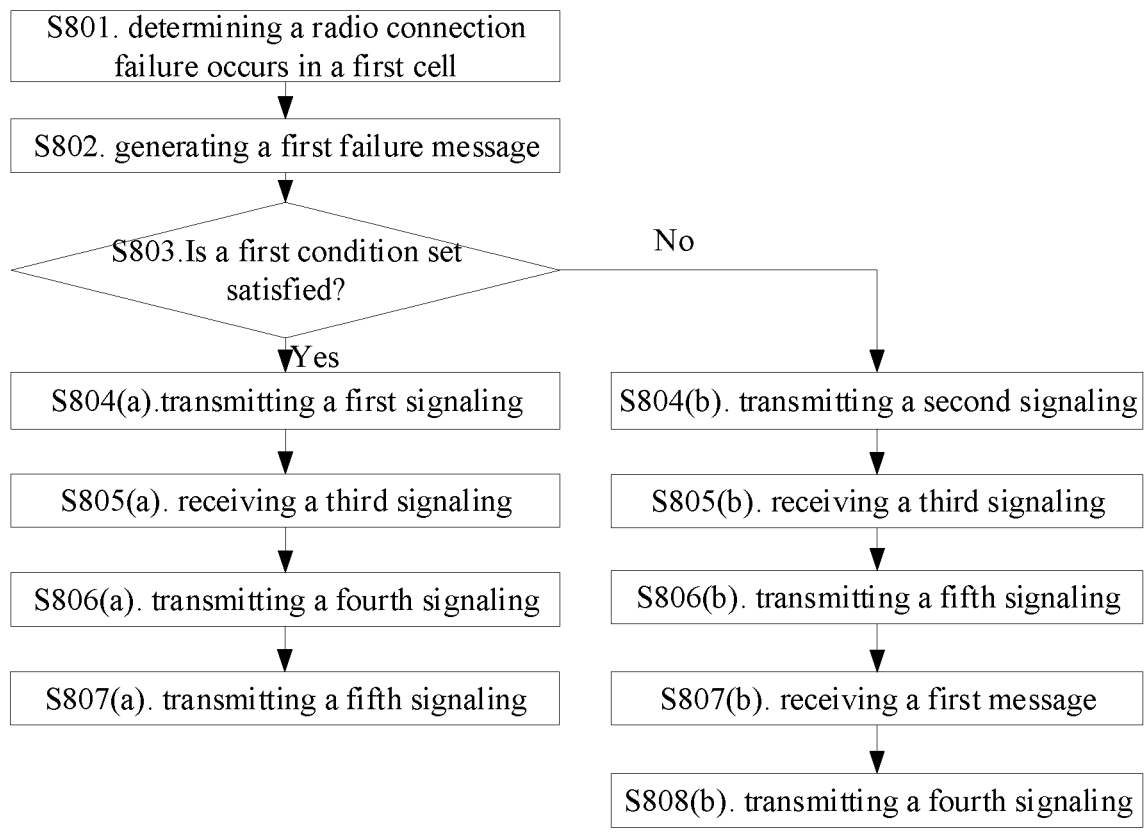
FIG. 8 illustrates a schematic diagram of whether a first condition set is satisfied being used for determining different procedures according to one embodiment of the present disclosure.

Embodiment 8 illustrates a schematic diagram of whether a first condition set is satisfied being used for determining different procedures according to one embodiment of the present disclosure, as shown in FIG. 8. In FIG. 8, each box represents a step. Particularly, the sequential order of steps in these boxes does not necessarily mean that the steps are chronologically arranged.

In Embodiment 8, the first node determines that a radio connection failure occurs in a first cell in step S801, generates a first failure message in step S802; judges whether a first condition set is satisfied in step S803; when a first condition set is satisfied, transmits a first signaling in step S804(*a*), receives a third signaling in step S805(*a*), transmits a fourth signaling in step S806(*a*), and transmits a fifth signaling in step S807(*a*); when the first condition set is not satisfied, transmits a second signaling in step S804(*b*), receives a third signaling in step S805(*b*), transmits a fifth signaling in step S806(*b*), receives a first message in step S807(*b*), and transmits a fourth signaling in step S808(*b*).

In one embodiment, when the first condition set is satisfied, the fast MCG recovery is performed.

In one embodiment, when the first condition set is not satisfied, the RRC connection reestablishment is performed.

In one embodiment, when the first condition set is satisfied, the fast MCG recovery is performed; and when the first condition set is not satisfied, the RRC connection reestablishment is performed.

In one embodiment, steps S804(*a*) to S807(*a*) are used for performing a Fast MCG Recovery.

In one subembodiment of the above embodiment, the Fast MCG Recovery comprises CHO.

In one subembodiment of the above embodiment, the Fast MCG Recovery comprises MCG Failure Information procedure.

In one embodiment, steps S804(*b*) to S806(*b*) are used for performing an RRC connection Reestablishment.

In one embodiment, steps S807(*b*) to S808(*b*) are used for procedures of UE information request and UE information response.

Embodiment 9

Figure 9:
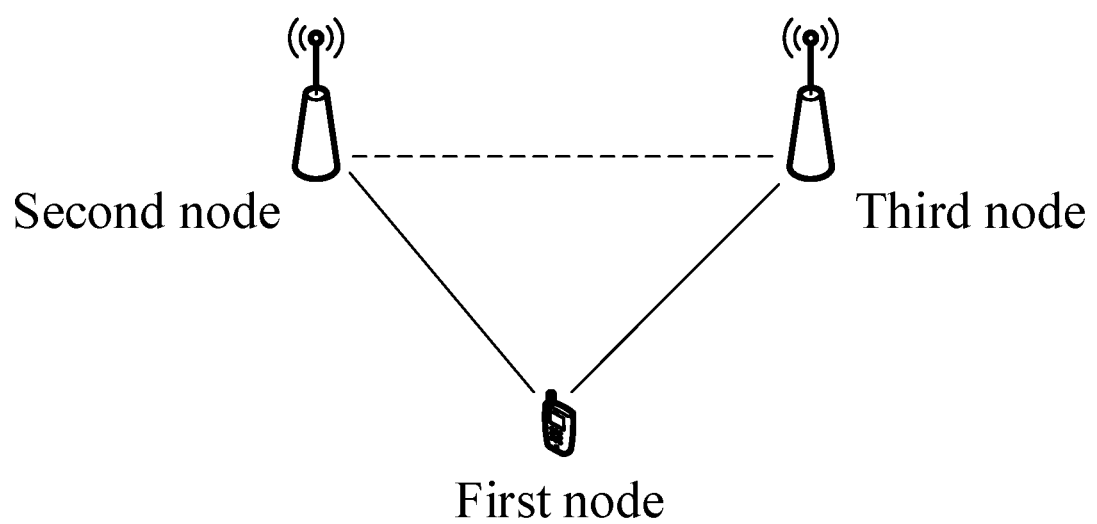
FIG. 9 illustrates a schematic diagram of a first node connecting with a second-type node and a third-type node simultaneously according to one embodiment of the present disclosure.

Embodiment 9 illustrates a schematic diagram of a first node performing connections with a second-type node and a third-type node simultaneously according to one embodiment of the present disclosure. In FIG. 9, the first node is a UE, the second-type node and the third-type node are respectively two base stations; two solid lines respectively represent a link between the first node and the second-type node as well as a link between the first node and the third-type node; and the dotted line represents a link between the second-type node and the third-type node.

In Embodiment 9, the first node connects with the second-type node and the third-type node simultaneously.

In one embodiment, the second-type node comprises the second node in the present disclosure.

In one embodiment, the third-type node comprises the third node in the present disclosure.

In one embodiment, the second-type node and the third-type node are connected via an Xn interface.

In one embodiment, the second-type node and the third-type node are connected via an Xn-C interface.

In one embodiment, the second-type node and the third-type node are connected via an X2-C interface.

In one embodiment, a link between the second-type node and the third-type node is non-ideal backhaul.

In one embodiment, a link between the second-type node and the third-type node is ideal backhaul.

In one embodiment, the first node and the third-type node are connected via a Uu interface.

In one embodiment, the first node and the second-type node are connected via a Uu interface.

In one embodiment, the first node is a device that supports dual connectivity.

In one embodiment, the first node supports Multi-Radio Dual Connectivity (MR-DC).

In one embodiment, the first node supports NR-NR Dual Connectivity (NR DC).

In one embodiment, the first node supports Intra-E-UTRA DC.

In one embodiment, the first node supports NR-E-UTRA Dual Connectivity (NE-DC).

In one embodiment, the first node supports NG-RAN E-UTRA-NR Dual Connectivity (NGEN-DC).

In one embodiment, the first node supports E-UTRA-NR Dual Connectivity (EN DC).

In one embodiment, the second-type node comprises a Master Node (MN).

In one embodiment, the second-type node comprises a Master eNodeB (MeNB).

In one embodiment, the second-type node comprises a Centralized Unit (CU).

In one embodiment, the second-type node comprises a node in an MCG.

In one embodiment, the second-type node comprises an SN.

In one embodiment, the second-type node comprises a Secondary eNodeB (SgNB).

In one embodiment, the second-type node comprises a Distributed Unit (DU).

In one embodiment, the second-type node comprises a node in an SCG.

In one embodiment, the second-type node is a base station that supports NR.

In one embodiment, the second-type node is a base station that supports EUTRA.

In one embodiment, the second-type node is a base station that supports WLAN.

In one embodiment, the second-type node is a base station that supports BT.

In one embodiment, the third-type node comprises an MN.

In one embodiment, the third-type node comprises an MeNB.

In one embodiment, the third-type node comprises a CU.

In one embodiment, the third-type node comprises a node in an MCG.

In one embodiment, the third-type node comprises an SN.

In one embodiment, the third-type node comprises a SgNB.

In one embodiment, the third-type node comprises a DU.

In one embodiment, the third-type node comprises a node in an SCG.

In one embodiment, the third-type node is a base station that supports NR.

In one embodiment, the third-type node is a base station that supports EUTRA.

In one embodiment, the third-type node is a base station that supports WLAN.

In one embodiment, the third-type node is a base station that supports BT.

In one embodiment, the second-type node is a receiver of the first signaling, and the third-type node is a maintenance base station of the first cell.

Embodiment 10

Embodiment 10 illustrates a schematic diagram of a first cell group comprising a first cell according to one embodiment of the present disclosure, as shown in FIG. 10.

In Embodiment 10, a first cell group comprises a first cell, the first cell group comprises Q1 first-type cell(s), and the first cell is one of the Q1 first-type cell(s), Q1 being a positive integer.

In one embodiment, the first cell group comprises an MCG.

In one embodiment, the first cell group comprises an SCG.

In one embodiment, the first cell group comprises a virtual cell.

In one embodiment, the first cell is an MN in the first cell group.

In one embodiment, the first cell comprises a PCell.

In one embodiment, the first cell comprises a PSCell.

In one embodiment, the first cell comprises a SPCell.

In one embodiment, the Q1 first-type cell(s) belongs (belong) to a same base station.

In one embodiment, the Q1 first-type cells belong to different base stations.

In one embodiment, the Q1 first-type cell(s) belongs (belong) to a same RAT.

In one embodiment, the Q1 first-type cells belong to different RATs.

In one embodiment, Q2 cell(s) in the Q1 first-type cell(s) is(are) MN(s), Q2 being a non-negative integer no greater than Q1.

In one subsidiary embodiment of the above embodiment, Q2 is equal to 1.

In one subsidiary embodiment of the above embodiment, Q2 is greater than 1.

Embodiment 11

Embodiment 11 illustrates a schematic diagram of a first failure sub-message comprising a second field according to one embodiment of the present disclosure, as shown in FIG. 11.

In Embodiment 11, the first failure sub-message comprises a second filed, and the second field is used for indicating RA information.

In one embodiment, the phrase that the first failure sub-message comprises a second field comprises that the second field is a field in the first failure sub-message.

In one embodiment, the phrase that the first failure sub-message comprises a second field comprises that the first failure sub-message is used for determining the second field.

In one embodiment, the phrase that the second field is used for indicating RA information comprises that the second field comprises the RA information.

In one embodiment, the phrase that the second field is used for indicating RA information comprises that the second field is used for determining the RA information.

In one embodiment, the RA information comprises information related to 4-Step RACH.

In one embodiment, the RA information comprises information related to 2-Step RACH.

In one embodiment, the first failure sub-message comprises second sub-information, the second sub-information indicates RA-related information.

In one subembodiment of the above embodiment, the second sub-information comprises one of more fields in the first signaling.

In one subembodiment of the above embodiment, the second sub-information comprises one or more fields in the first failure sub-message.

In one subembodiment of the above embodiment, the second sub-information comprises all or part of a RAReportList.

In one subembodiment of the above embodiment, the second sub-information comprises all or part of a RAReport.

In one subembodiment of the above embodiment, the second sub-information comprises all or part of a cellId.

In one subembodiment of the above embodiment, the second sub-information comprises all or part of absoluteFrequencyPointA.

In one subembodiment of the above embodiment, the second sub-information comprises all or part of locationAndBandwidth.

In one subembodiment of the above embodiment, the second sub-information comprises all or part of a subcarrierSpacing.

In one subembodiment of the above embodiment, the second sub-information comprises all or part of msg1-Frequency Start.

In one subembodiment of the above embodiment, the second sub-information comprises all or part of msg1-SubcarrierSpacing.

In one subembodiment of the above embodiment, the second sub-information comprises all or part of msg1-FDM.

In one subembodiment of the above embodiment, the second sub-information comprises all or part of raPurpose.

In one subembodiment of the above embodiment, the second sub-information comprises all or part of a perRAInfoList.

In one subembodiment of the above embodiment, the second sub-information comprises all or part of a PerRAInfoList.

In one subembodiment of the above embodiment, the second sub-information comprises all or part of PerRAInfo.

In one subembodiment of the above embodiment, the second sub-information comprises all or part of a perRASSBInfoList.

In one subembodiment of the above embodiment, the second sub-information comprises all or part of a perRACSI-RSInfoList.

In one subembodiment of the above embodiment, the second sub-information comprises all or part of a PerRAAttemptInfoList.

Embodiment 12

Figure 12:
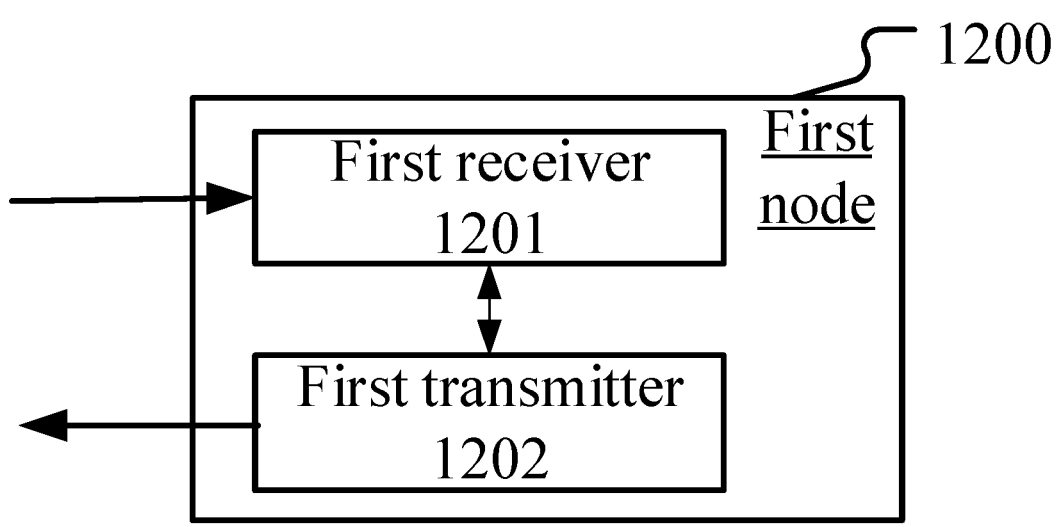
FIG. 12 illustrates a structure block diagram of a processing device in a first node according to one embodiment of the present disclosure.

Embodiment 12 illustrates a structure block diagram of a processing device in a first node according to one embodiment of the present disclosure; as shown in FIG. 12. In FIG. 12, a processing device 1200 in a first node comprises a first receiver 1201 and a first transmitter 1202.

a first receiver 1201, determines that a radio connection failure occurs in a first cell, as a response to determining that the radio connection failure occurs in the first cell, generates a first failure message;
a first transmitter, when the first condition set is satisfied, transmits a first signaling; and when the first condition set is not satisfied, transmits a second signaling; and
the first receiver 1201 receives a third signaling;
In Embodiment 12, the first signaling is used for initiating a radio connection recovery performed on the first cell, the first signaling comprises a first failure sub-message; the first failure message comprises the first failure sub-message; the second signaling is used for requesting a radio resource control reestablishment; the first condition set comprises a phrase for determining that the radio connection failure occurs in the first cell; the third signaling is used for updating a radio connection; when the first condition set is satisfied, the first signaling is used for triggering the third signaling, and when the first condition set is not satisfied, the second signaling is used for triggering the third signaling.

In one embodiment, the first transmitter 1202, transmits a fourth signaling; herein, the fourth signaling comprises information in the first failure message at least other than the first failure sub-message.

In one embodiment, the third signaling comprises a first field, and a first field in the third signaling is used for triggering the fourth signaling.

In one embodiment, when the fourth signaling is triggered by a first message, the fourth signaling comprises the first failure sub-message; when the fourth signaling is triggered by the third signaling, the fourth signaling does not comprise the first failure sub-message.

In one embodiment, the first receiver 1201, clears the first failure message.

In one embodiment, the first transmitter 1202, transmits a fifth signaling; herein, the fifth signaling is used for performing a confirmation on the third signaling; the fifth signaling indicates whether the first failure message is available.

In one embodiment, the first failure sub-message comprises a second filed, and the second field is used for indicating RA information.

In one embodiment, the first receiver 1201 comprises the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201 comprises the antenna 452, the receiver 454, the multi-antenna receiving processor 458 and the receiving processor 456 in FIG. 4 of the present disclosure.

In one embodiment, the first receiver 1201 comprises the antenna 452, the receiver 454 and the receiving processor 456 in FIG. 4 of the present disclosure.

In one embodiment, the first transmitter 1202 comprises the antenna 452, the transmitter 454, the multi-antenna transmitting processor 457, the transmitting processor 468, the controller/processor 459, the memory 460, and the data source 467 in FIG. 4 of the present disclosure.

In one embodiment, the first transmitter 1202 comprises the antenna 452, the transmitter 454, the multi-antenna transmitting processor 457 and the transmitting processor 468 in FIG. 4 of the present disclosure.

In one embodiment, the first transmitter 1202 comprises the antenna 452, the transmitter 454 and the transmitting processor 468 in FIG. 4 of the present disclosure.

Embodiment 13

Figure 13:
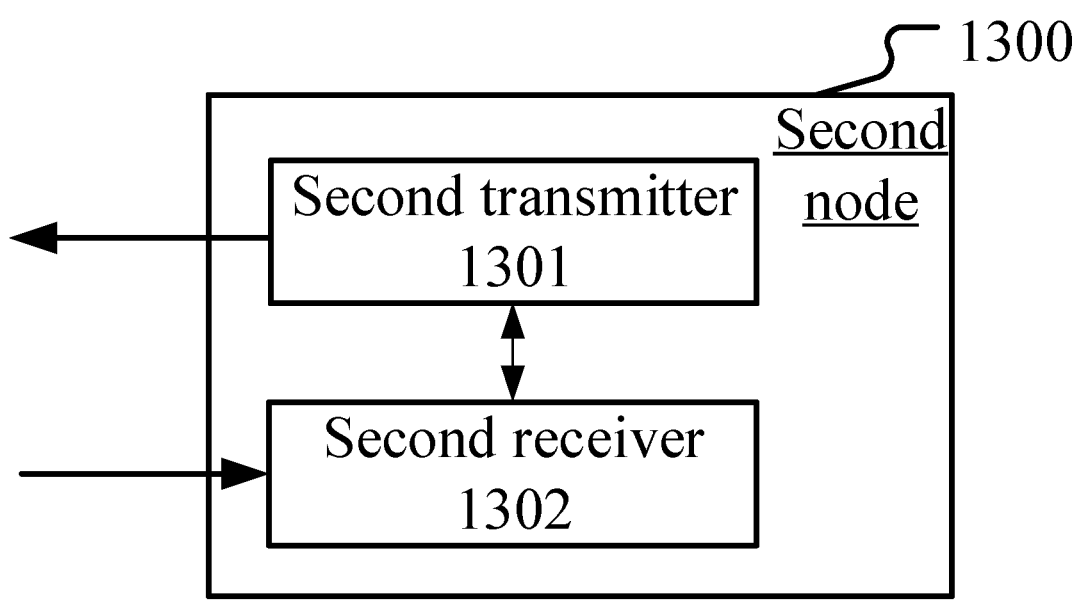
FIG. 13 illustrates a structure block diagram of a processing device in a second node according to one embodiment of the present disclosure.

Embodiment 13 illustrates a structure block diagram of a processing device in a second node according to one embodiment of the present disclosure, as shown in FIG. 13. In FIG. 13, a second node's processing device 1300 comprises a second transmitter 1301 and a second receiver 1302.

The second receiver 1302, when a first condition set is satisfied, receives a first signaling; when the first condition set is not satisfied, receives a second signaling; and
the second transmitter 1301, transmits a third signaling.

In Embodiment 13, as a response to determining that the radio connection failure occurs in a first cell, a first failure message is generated; the first signaling is used for initiating a radio connection recovery performed on the first cell, the first signaling comprises a first failure sub-message; the first failure message comprises the first failure sub-message; the second signaling is used for requesting a radio resource control reestablishment; the first condition set comprises a phrase for determining that the radio connection failure occurs in the first cell; the third signaling is used for updating a radio connection; when the first condition set is satisfied, the first signaling is used for triggering the third signaling, and when the first condition set is not satisfied, the second signaling is used for triggering the third signaling.

In one embodiment, the second receiver 1302 receives a fourth signaling; herein, the fourth signaling comprises information in the first failure message at least other than the first failure sub-message.

In one embodiment, the third signaling comprises a first field, and a first field in the third signaling is used for triggering the fourth signaling.

In one embodiment, when the fourth signaling is triggered by a first message, the fourth signaling comprises the first failure sub-message; when the fourth signaling is triggered by the third signaling, the fourth signaling does not comprise the first failure sub-message.

In one embodiment, the first failure message is cleared.

In one embodiment, the second receiver 1302, receives a fifth signaling; herein, the fifth signaling is used for performing a confirmation on the third signaling; and the fifth signaling indicates whether the first failure message is available.

In one embodiment, the first failure sub-message comprises a second filed, and the second field is used for indicating RA information.

In one embodiment, the second transmitter 1301 comprises the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301 comprises the antenna 420, the transmitter 418, the multi-antenna transmitting processor 471 and the transmitting processor 416 in FIG. 4 of the present disclosure.

In one embodiment, the second transmitter 1301 comprises the antenna 420, the transmitter 418 and the transmitting processor 416 in FIG. 4 of the present disclosure.

In one embodiment, the second receiver 1302 comprises the antenna 420, the receiver 418, the multi-antenna receiving processor 472, the receiving processor 470, the controller/processor 475 and the memory 476 in FIG. 4 of the present disclosure.

In one embodiment, the second receiver 1302 comprises the antenna 420, the receiver 418, the multi-antenna receiving processor 472 and the receiving processor 470 in FIG. 4 of the present disclosure.

In one embodiment, the second receiver 1302 comprises the antenna 420, the receiver 418 and the receiving processor 470 in FIG. 4 of the present disclosure.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, determining that a radio connection failure occurs in a first cell, and storing a first failure message in a VarRLF-Report upon determination of the radio connection failure, wherein the first failure message is cleared when a first failure sub-message is successfully reported;
a first transmitter, when a first condition set is satisfied, transmitting a first signaling; when the first condition set is not satisfied, transmitting a second signaling; and
the first receiver, receiving a third signaling; and
the first transmitter, transmits a fourth signaling, wherein the fourth signaling comprises a UEInformationResponse message, and the fourth signaling comprises information in the first failure message at least other than the first failure sub-message; the third signaling comprises a first field, and a first field in the third signaling is used for triggering the fourth signaling;
wherein:
the first signaling is used for initiating a radio connection recovery performed on the first cell, the first signaling comprises the first failure sub-message, a signaling radio bearer of the first signaling comprises SRB1;
the first failure message comprises the first failure sub-message;
the second signaling is used for requesting a radio resource control reestablishment;
the first condition set comprises a phrase for determining that the radio connection failure occurs in the first cell;
the third signaling is used for updating a radio connection; and
when the first condition set is satisfied, the first signaling is used for triggering the third signaling, and when the first condition set is not satisfied, the second signaling is used for triggering the third signaling; the radio connection recovery is performed through a Sidelink; the first node is a UE, and the first node supports Sidelink communications.

2. The first node according to claim 1, wherein the first failure sub-message is deemed successfully reported when the third signaling is successfully received in response to the first signaling;
the first signaling comprises an MCGFailureInformation message; and the third signaling comprises an RRCReconfiguration message, or, the third signaling comprises an RRCConnectionReconfiguration message, or, the third signaling comprises an RRCRelease message, or, the third signaling comprises an RRCConnectionRelease message.

3. The first node according to claim 2,
wherein the phrase that a first field in the third signaling is used for triggering the fourth signaling comprises: there exists the first field in the third signaling used for triggering the fourth signaling.

4. The first node according to claim 3, wherein:
the phrase when the fourth signaling is triggered by the third signaling comprises the phrase that the updating a radio connection comprises a radio resource control connection reconfiguration.

5. The first node according to claim 3, wherein:
when the fourth signaling is triggered by a first message, the fourth signaling comprises the first failure sub-message; when the fourth signaling is triggered by the third signaling, the fourth signaling does not comprise the first failure sub-message.

6. The first node according to claim 1, wherein:
the first condition set is not satisfied when the second signaling comprises an RRCReestablishmentRequest message and/or the third signaling comprises an RRCReestablishment message.

7. The first node according to claim 1, wherein the first failure sub-message comprises first sub-information, the first sub-information being used for indicating a cause for the radio connection failure.

8. The first node according to claim 7, wherein a value of the first sub-information comprises a t312-Expiry.

9. The first node according to claim 7, wherein a value of the first sub-information comprises a beamFailureRecoveryFailure.

10. The first node according to claim 1, comprising:
the first transmitter, transmitting a fifth signaling;
wherein the fifth signaling is used for performing a confirmation on the third signaling; and
the fifth signaling indicates whether the first failure message is available.

11. The first node according to claim 10, wherein:
the first condition set is satisfied when the third signaling comprises an RRCReconfiguration message and/or the fifth signaling comprises an RRCReconfigurationComplete message, and
the first failure message is deemed unavailable when the fifth signaling does not comprise rlf-InfoAvailable.

12. The first node according to claim 10, wherein:
the first condition set is not satisfied when the third signaling comprises an RRCReestablishment message and/or the fifth signaling comprises an RRCReestablishmentComplete message, and
the first failure message is deemed available when the fifth signaling comprises lf-InfoAvailable.

13. The first node according to any claim of claim 1, wherein the first condition set being satisfied comprises that the first node is configured with split SRB1, an MCG is not suspended, a first timer is configured, and the first timer is not running, the first timer comprises T316.

14. The first node according to claim 1, wherein the phrase for determining that a radio connection failure occurs in a first cell comprises that a Radio Link Failure (RLF) between the first node and the first cell is determined, and the first cell is a PCell.

15. A method in a first node for wireless communications, comprising:
determining that a radio connection failure occurs in a first cell, and storing a first failure message in a VarRLF-Report when the radio connection failure occurs in the first cell;
clearing the first failure message when a first failure sub-message is successfully reported;
when a first condition set is satisfied, transmitting a first signaling;
when the first condition set is not satisfied, transmitting a second signaling;
receiving a third signaling; and
the first transmitter transmitting a fourth signaling, wherein the fourth signaling comprises a UEInformationResponse message, and the fourth signaling comprises information in the first failure message at least other than the first failure sub-message; wherein:
the third signaling comprises a first field, and a first field in the third signaling is used for triggering the fourth signaling;
the first signaling is used for initiating a radio connection recovery performed on the first cell;
the first signaling comprises the first failure sub-message, a signaling radio bearer of the first signaling comprises SRB1;
the first failure message comprises the first failure sub-message;
the second signaling is used for requesting a radio resource control reestablishment;
the first condition set comprises a phrase for determining that the radio connection failure occurs in the first cell;
the third signaling is used for updating a radio connection;
when the first condition set is satisfied, the first signaling is used for triggering the third signaling; and
when the first condition set is not satisfied, the second signaling is used for triggering the third signaling; the radio connection recovery is performed through a Sidelink; the first node is a UE, and the first node supports Sidelink communications.

16. The method according to claim 15, wherein:
the first failure sub-message is deemed successfully reported when the third signaling is successfully received in response to the first signaling;
the first signaling comprises an MCGFailureInformation message; and
the third signaling comprises an RRCReconfiguration message, or, the third signaling comprises an RRCConnectionReconfiguration message, or, the third signaling comprises an RRCRelease message, or, the third signaling comprises an RRCConnectionRelease message.

17. The method according to claim 15, wherein:
the first failure sub-message comprises first sub-information;
the first sub-information being used for indicating a cause for the radio connection failure; and
a value of the first sub-information comprises t312-Expiry, or a value of the first sub-information comprises a beamFailureRecoveryFailure.

18. A second node for wireless communications, comprising:
a second receiver, arranged to receive a first signaling when a first condition set is satisfied, and receiving a second signaling when the first condition set is not satisfied; and a second transmitter, transmitting a third signaling; wherein:

the second receiver receives a fourth signaling;

the fourth signaling comprises a UEInformationResponse message, and the fourth signaling comprises information in the first failure message at least other than the first failure sub-message;

the third signaling comprises a first field, and a first field in the third signaling is used for triggering the fourth signaling;

as a response to determining that the radio connection failure occurs in a first cell, a first failure message is stored in a VarRLF-Report;

the first failure message is cleared when a first failure sub-message is successfully reported;

the first signaling is used for initiating a radio connection recovery performed on the first cell, the first signaling comprises the first failure sub-message, a signaling radio bearer of the first signaling comprises SRB1;

the first failure message comprises the first failure sub-message;

the second signaling is used for requesting a radio resource control reestablishment;

the first condition set comprises a phrase for determining that the radio connection failure occurs in the first cell;

the third signaling is used for updating a radio connection;

when the first condition set is satisfied, the first signaling is used for triggering the third signaling; and when the first condition set is not satisfied, the second signaling is used for triggering the third signaling; the radio connection recovery is performed through a Sidelink; the receiver of the third signaling is a UE, and the receiver of the third signaling supports Sidelink communications.

19. The second node according to claim 18, further comprising:

the second receiver, receiving a fifth signaling when the first condition set is satisfied; wherein:

the fifth signaling is used for performing a confirmation on the third signaling;

the first signaling comprises an MCGFailureInformation message;

the third signaling comprises an RRCReconfiguration message;

the fifth signaling comprises an RRCReconfigurationComplete message; and the first failure message is deemed unavailable when the fifth signaling does not comprise rlf-InfoAvailable.

20. The second node according to claim 18, wherein:

the first failure sub-message comprises first sub-information;

the first sub-information being used for indicating a cause for the radio connection failure; and a value of the first sub-information comprises t312-Expiry, or a value of the first sub-information comprises a beamFailureRecoveryFailure.

* * * * *